(12) United States Patent
Furuno

(10) Patent No.: US 8,024,094 B2
(45) Date of Patent: Sep. 20, 2011

(54) MAINTENANCE HISTORY INFORMATION MANAGEMENT SYSTEM FOR CONSTRUCTION MACHINE

(75) Inventor: Yoshinori Furuno, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 581 days.

(21) Appl. No.: 12/063,717

(22) PCT Filed: Jan. 5, 2007

(86) PCT No.: PCT/JP2007/050047
§ 371 (c)(1),
(2), (4) Date: Feb. 13, 2008

(87) PCT Pub. No.: WO2007/080835
PCT Pub. Date: Jul. 19, 2007

(65) Prior Publication Data
US 2009/0265064 A1   Oct. 22, 2009

(30) Foreign Application Priority Data
Jan. 12, 2006   (JP) .................................. 2006-004873

(51) Int. Cl.
*G06F 17/30* (2006.01)
(52) U.S. Cl. ................. 701/50; 701/30; 701/33; 701/35
(58) Field of Classification Search .............. 701/29–36, 701/50, 213; 345/169
See application file for complete search history.

(56) References Cited

U.S. PATENT DOCUMENTS

| | | | | |
|---|---|---|---|---|
| 5,737,215 A | * | 4/1998 | Schricker et al. | 700/29 |
| 7,228,125 B2 | * | 6/2007 | Adachi et al. | 455/414.2 |
| 7,493,112 B2 | * | 2/2009 | Adachi et al. | 455/420 |
| 2004/0147250 A1 | | 7/2004 | Adachi et al. | |

FOREIGN PATENT DOCUMENTS

| | | |
|---|---|---|
| JP | 2002-325060 | 11/2002 |
| JP | 2003-119830 | 4/2003 |
| JP | 2004-322862 | 11/2004 |

* cited by examiner

*Primary Examiner* — Richard M. Camby
(74) *Attorney, Agent, or Firm* — Mattingly & Malur, PC

(57) ABSTRACT

The present invention provides a maintenance history information management system for a construction machine that is capable of enhancing the reliability of temporal information about maintenance history data. A data recording device 30 is incorporated in a hydraulic excavator 1 or other construction machine to process operating time or date and time. A mobile terminal 34 includes a CPU 36 for displaying construction machine maintenance items on a monitor 38. A worker can input data for the maintenance items as the maintenance history data. The mobile terminal 34 inputs the operating time or date and time from the data recording device 30 via a communication cable and a communication connector and stores the input operating time or date and time in a storage device 35 in association with the maintenance history data.

13 Claims, 29 Drawing Sheets

FIG.5B

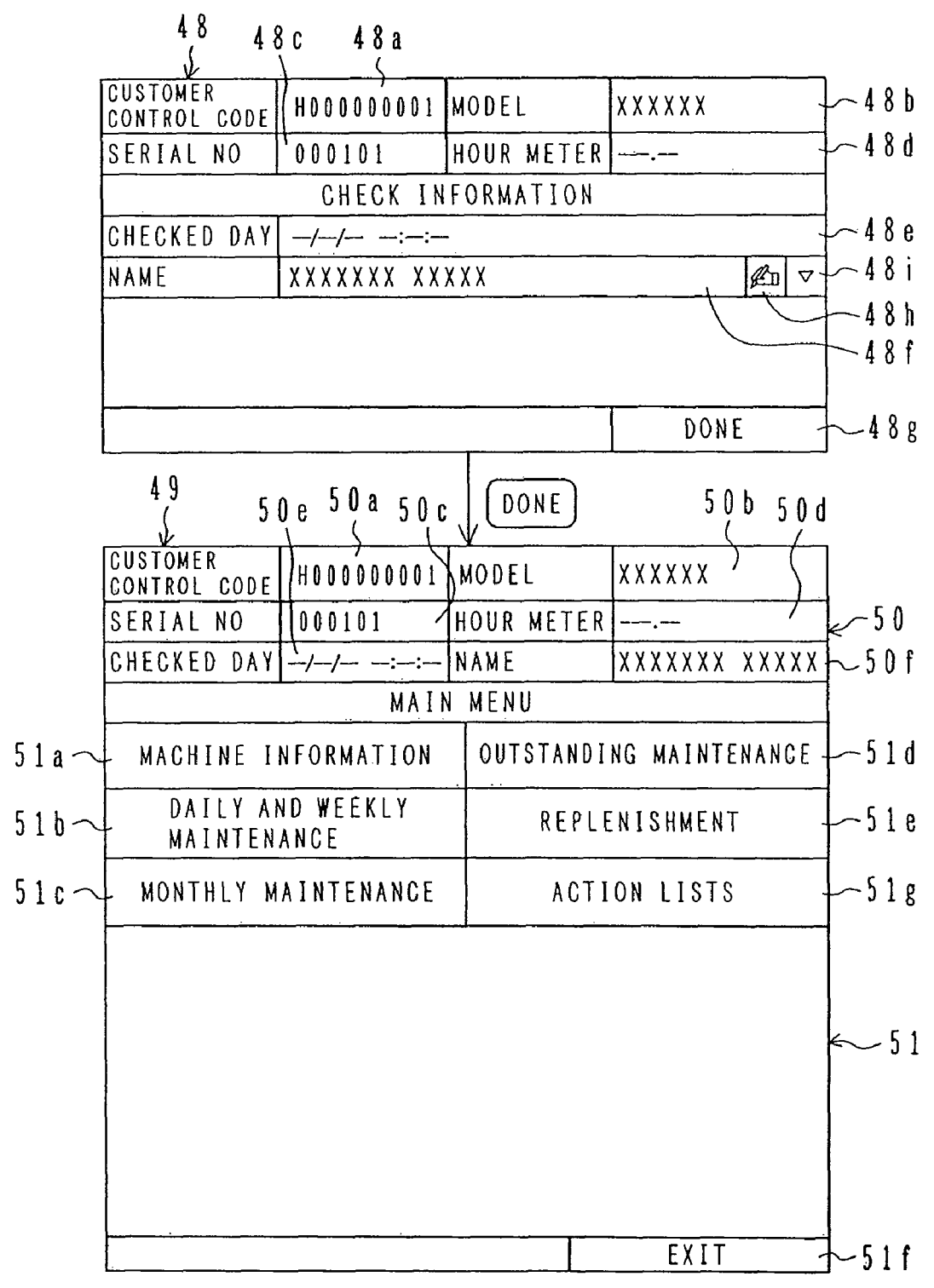

| CUSTOMER CONTROL CODE | H000000001 | MODEL | XXXXX |
|---|---|---|---|
| SERIAL NO | 000101 | HOUR METER | —.— |
| CHECK INFORMATION ||||
| CHECKED DAY | —/—/— —:—:— |||
| NAME | XXXXXXX XXXXX |||
|  |  |  | DONE |

[DONE]

| CUSTOMER CONTROL CODE | H000000001 | MODEL | XXXXX |
|---|---|---|---|
| SERIAL NO | 000101 | HOUR METER | —.— |
| CHECKED DAY | —/—/— —:—:— | NAME | XXXXXXX XXXXX |
| MAIN MENU ||||
| MACHINE INFORMATION || OUTSTANDING MAINTENANCE ||
| DAILY AND WEEKLY MAINTENANCE || REPLENISHMENT ||
| MONTHLY MAINTENANCE || ACTION LISTS ||
|  |  |  | EXIT |

FIG. 7A

| CUSTOMER CONTROL CODE | H000000001 | MODEL | XXXXXX |
|---|---|---|---|
| SERIAL NO | 000101 | HOUR METER | —.— |
| CHECKED DAY | —/—/— —:—:— | NAME | XXXXXXX XXXXX |

| DAILY AND WEEKLY MAINTENANCE MENU ||
|---|---|
| DAILY MAINTENANCE | NEW FINDINGS |
| WEEKLY MAINTENANCE | |
| TOTAL AMOUNT OF REFILLED/REPLACED | |
| | |
| | MAIN MENU |

[DAILY MAINTENANCE] [DONE]

| CUSTOMER CONTROL CODE | H000000001 | MODEL | XXXXXX |
|---|---|---|---|
| SERIAL NO | 000101 | HOUR METER | —.— |
| CHECKED DAY | —/—/— —:—:— | NAME | XXXXXXX XXXXX |

| DAILY MAINTENANCE ||||||
|---|---|---|---|---|---|
| NO | DESCRIPTION | PREVIOUS | CHECK RESULT ||| 3 |
| 01 | XXXXXXXX XXXX XXXXXX | | YES | | |
| 02 | XXXXXXXX XXXX XXXXXX | | YES | | |
| 03 | XXXXXXXX XXXX XXXXXX | | YES | | |

| NEW FINDINGS | | DONE |

FIG.11

| CUSTOMER CONTROL CODE | H000000001 | MODEL | XXXXX |
|---|---|---|---|
| SERIAL NO | 000101 | HOUR METER | --.-- |
| CHECKED DAY | --/--/-- --:--:-- | NAME | XXXXXXX XXXXX |

OUTSTANDING MAINTENANCE

| NO | DESCRIPTION | PREVIOUS | CHECK RESULT | | 14 |
|---|---|---|---|---|---|
| 02 | XXXXXXXX XXXX XXXXX | | YES | | |
| 03 | XXXXXXXX XXXX XXXXX | | YES | | |
| 04 | XXXXXXXX XXXX XXXXX | | YES | | |
| 06 | XXXXXXXX XXXX XXXXX | | YES | | |
| 07 | XXXXXXXX XXXX XXXXX | | YES | | |
| 08 | XXXXXXXX XXXX XXXXX | | YES | | |

| NEW FINDINGS | | DONE |
|---|---|---|

FIG. 13

| CUSTOMER CONTROL CODE | H000000001 | MODEL | XXXXX |
|---|---|---|---|
| SERIAL NO | 000101 | HOUR METER | ----.- |
| NAME | XXXXXX XXXX | | |
| REPLENISHMENT | | | |
| DATE | ----/--/-- | | ▽ |
| TIME | --:--:-- | | ▽ |
| OIL | ENGINE OIL | | ▽ |
| AMOUNT | 0.0 | | |

UNIT:Gallon         DONE

FIG.14

| CUSTOMER CONTROL CODE | H000000001 | MODEL | XXXXXX |
|---|---|---|---|
| SERIAL NO | 000101 | HOUR METER | ---.- |
| CHECKED DAY | --/--/-- --:--:-- | NAME | XXXXXXX XXXXX |

| MACHINE INFORMATION |||
|---|---|---|
| FRONT TYPE | loader | 72a |
| FIRST ENGINE NO | X000000001 | 72b |
| SECOND ENGINE NO | X000000002 | 72c |
| DELIVERY DAY | ----/--/-- | 72d |

MAIN MENU — 72e

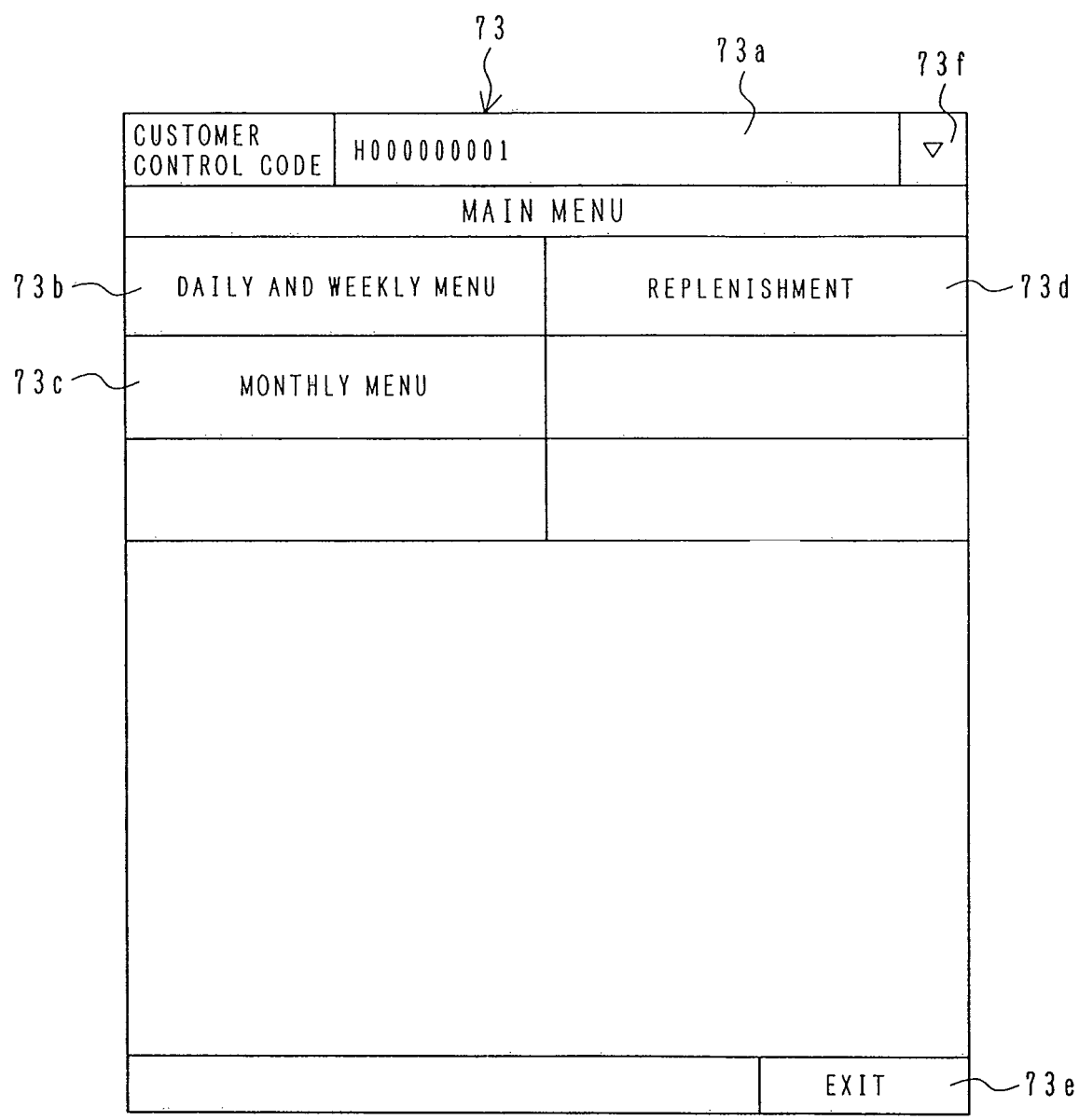

FIG. 16A

| CUSTOMER CONTROL CODE | H000000001 | MODEL NAME | XXXXXX | ▽ |
|---|---|---|---|---|
| SERIAL NO | 000101 | ▽ | | |
| CHECKED TIME | --/--/-- --:--:-- | ~ | --/--/-- --:--:-- | |

DAILY AND WEEKLY REPORT MENU

| DAILY REPORT | |
|---|---|
| WEEKLY REPORT | |
| TOTAL AMOUNT OF REFILLED/REPLACED | |

MAIN MENU

[DAILY REPORT] [DONE]

| CUSTOMER CONTROL CODE | H000000001 | MODEL NAME | XXXXXX |
|---|---|---|---|
| SERIAL NO | 000101 | | |
| CHECKED TIME | --/--/-- --:--:-- | ~ | --/--/-- --:--:-- |

DAILY REPORT

| CHECKED DAY | |
|---|---|
| CHECKED TIME | |
| HOUR METER | |
| 01 | XXXXXXXX XXXX XXXXXX | YES |
| 02 | XXXXXXXX XXXX XXXXXX | YES |
| 03 | XXXXXXXX XXXX XXXXXX | YES |

SUB MENU

FIG. 17

| CUSTOMER CONTROL CODE | H000000001 | MODEL NAME | XXXXXX | ▽ |
|---|---|---|---|---|
| SERIAL NO | 000101 | ▽ | | |
| CHECKED TIME | —/—/— —:—:— | ~ | —/—/— —:—:— | |

MONTHLY MENU

| REPLACEMENT ITEMS | DRAINING |
|---|---|
| CLEANING ITEMS | VISUAL CHECK ITEMS |
| GREASING | |

MAIN MENU

[ REPLACEMENT ITEMS ]  [ DONE ]

| CUSTOMER CONTROL CODE | H000000001 | MODEL NAME | XXXXXX |
|---|---|---|---|
| SERIAL NO | 000101 | | |
| CHECKED TIME | —/—/— —:—:— | ~ | —/—/— —:—:— |

MONTHLY REPORT (REPLACEMENT ITEMS)

| | | | |
|---|---|---|---|
| CHECKED DAY | | | |
| CHECKED TIME | | | |
| HOUR METER | | | |
| 01 | XXXXXXXX XXXX XXXXXX | YES | |
| 02 | XXXXXXXX XXXX XXXXXX | YES | |
| 03 | XXXXXXXX XXXX XXXXXX | YES | |

SUB MENU

FIG. 18

| CUSTOMER CONTROL CODE | H000000001 | MODEL | XXXXXX |
|---|---|---|---|
| SERIAL NO | 000101 | | |
| REPLENISHMENT ||||
| DATE | ---/--/-- | | ▽ |
| TIME | --:--:-- | | ▽ |
| HOUR METER | --- | | 🖉 |
| NAME | XXXXXX XXXXX | | 🖉 ▽ |
| OIL | ENGINE OIL | | ▽ |
| AMOUNT | 0.0 | | 🖉 |

UNIT:Gallon          DONE

FIG. 22

| CUSTOMER CONTROL CODE | H000000001 | MODEL | XXXXXX |
|---|---|---|---|
| SERIAL NO | 000101 | HOUR METER | --.-- |
| CHECKED DAY | --/--/-- --:--:-- | NAME | XXXXXXX XXXXX |

NEW FINDINGS REPORT

Text   Pic

Save

Location

Open

Items

Symptoms

Damage Level  ○ Heavy    ○ Fair
              ○ Light    ○ Information Only

Picture  [Insert Picture]

Countermeasure

Clear

P/N

Additional Coments

Submit

Back                                    Main Menu

FIG. 23

| FIRSTR ITEM | SECOND ITEM |
|---|---|
| FRONT OPERATING MECHANISM | BUCKET |
| | ARM |
| | BOOM |
| CAB | LEVER |
| | CONSOLE |
| | SEAT |
| | AIR CONDITIONER |
| LEFT-HAND HOUSING | CAB BED |
| | STAIRCASE |
| | PUMP CHAMBER |
| | ENGINE CHAMBER |
| | HOUSING TOP |
| RIGHT-HAND HOUSING | OIL COOLER CHAMBER |
| | PUMP CHAMBER |
| | ENGINE CHAMBER |
| | HOUSING TOP |
| CENTER (BETWEEN HOUSINGS) | CONTROL VALVE SECTION |
| | HYDRAULIC FLUID TANK |
| | FUEL TANK |
| LEFT-HAND TRACK | UPPER ROLLER |
| | LOWER ROLLER |
| | DRIVE TUMBLER |
| | IDLER |
| | SHOE |
| RIGHT-HAND TRACK | UPPER ROLLER |
| | LOWER ROLLER |
| | DRIVE TUMBLER |
| | IDLER |
| | SHOE |
| COUNTERWEIGHT | |

FIG. 24

| FIRSTR ITEM | SECOND ITEM |
|---|---|
| HOSE | |
| FRAME | |
| WELD ZONE | |
| WIRE | |
| ELECTRICAL PART | RELAY |
| | LIGHT |
| | SWITCH |
| | SENSOR |
| | RADIO |
| COMPONENT | ENGINE |
| | HYDRAULIC PUMP/MOTOR |
| | ELECTRIC PUMP/MOTOR |
| | VALVE |
| | COOLING FAN |
| | HEAT EXCHANGER |
| OTHER | HANDRAIL |
| | AIR HORN |

FIG. 25

| CUSTOMER CONTROL CODE | H0000000.01 | MODEL | XXXXXX |
|---|---|---|---|
| SERIAL NO | 000101 | HOUR METER | ---.-- |
| CHECKED DAY | --/--/-- --:--:-- | NAME | XXXXXXX XXXXX |

ACTION LISTS

| NO | DESCRIPTION | P/N | CHECK RESULT | | | 1 |
|---|---|---|---|---|---|---|
| 01 | | | OK | NG | ACT | |

106a 106b 106c 106d 106e 106f 106g

DONE

MAINTENANCE HISTORY INFORMATION MANAGEMENT SYSTEM FOR CONSTRUCTION MACHINE

TECHNICAL FIELD

The present invention relates to a construction machine maintenance history information management system that is suitable for managing the maintenance history information about hydraulic excavators and other construction machines.

BACKGROUND ART

When a hydraulic excavator or other construction machine was to be inspected in the past, a worker, who belonged, for instance, to a construction machine manufacturer or servicing company, visited a work site with having a maintenance form (checklist) and wrote maintenance results into the maintenance form. Then, the worker brought the maintenance form back and typed the maintenance results by use of a terminal to enter them into a management server. The maintenance result input process was not efficiently performed because it took a lot of trouble to write the maintenance results into the maintenance form and to type them by use of the terminal. To solve such a problem, a maintenance information transmission/reception system is proposed, for instance, by Patent Document 1. This maintenance information transmission/reception system includes a cellular phone, which allows the user to enter, for instance, hydraulic excavator maintenance results and transmit the entered information, and a management server, which is installed, for instance, at a manufacturer's facility or at a servicing company to transmit information to and receive information from the cellular phone.

Patent Document 1: JP-A-2002-325060

DISCLOSURE OF INVENTION

Problem to be Solved by the Invention

For example, a large-size hydraulic excavator for use in soil/stone excavation at a large work site is generally operated continuously for productivity improvement purposes. If, for instance, an abnormality occurs in the hydraulic excavator, it is necessary to stop its operation for a long period of time and to change the execution of a production plan depending on the severity of the abnormality. A known technology for handling such a situation is used to furnish the hydraulic excavator, for instance, with a plurality of sensors and a data control device that processes and stores detected data fed from the sensors. With the known technology, fault diagnostics can be performed by referencing the detected data stored in the data control device, and the hydraulic excavator downtime can be reduced. Further, some hydraulic excavator faults and abnormalities are detected only through visual inspection, and it is desired that such faults and abnormalities be detected before the hydraulic excavator malfunctions. For such a reason, hydraulic excavator maintenance is regarded as important, and the number of maintenance items and the frequency of maintenance have relatively increased. Furthermore, fault diagnostics can be performed in accordance with the temporal relationship between maintenance history data and the data detected from an abnormal hydraulic excavator. More specifically, if, for instance, an overheat or other similar abnormality is encountered in a situation where the normality of a radiator is indicated by the maintenance history data obtained from a radiator maintenance performed immediately before the occurrence of such an abnormality, it can be judged that the abnormality is highly attributable to a device other than the radiator. Fault diagnostics can then be performed by referencing the detected data related to devices other than the radiator. Consequently, fault diagnostics can be carried out more rapidly with increased precision.

However, the above-mentioned conventional technology does not propose a definite method for acquiring temporal information about the maintenance history data. Therefore, there is room for improvement. If, for instance, the date and time of the hydraulic excavator disagrees with the date and time of the cellular phone for some reason in a situation where the maintenance history data is generated with reference to the date and time of the cellular phone, it may be impossible to accurately determine the temporal relationship between the maintenance history data and the occurrence of a hydraulic excavator abnormality. Further, if the maintenance history data is generated, for instance, by entering the operating time indicated by an indicator on the hydraulic excavator, it is probable that incorrect data may be entered and that the entered data may vary from one person to another. This again may make it impossible to accurately determine the temporal relationship between the maintenance history data and the occurrence of a hydraulic excavator abnormality.

A first object of the present invention is to provide a construction machine maintenance history information management system that is capable of enhancing the reliability of temporal information about maintenance history data.

A second object of the present invention is to provide a construction machine history information management system for generating maintenance history data that can be used to accurately determine the temporal relationship between the maintenance history data and the occurrence of a construction machine abnormality.

Means for Solving the Problem (1) In accomplishing the above objects, according to one aspect of the present invention, there is provided a maintenance history information management system for a construction machine, comprising: a data control device being incorporated to process operating time or date and time; and a mobile terminal including control means for displaying construction machine maintenance items on display means, input means for enabling a worker to enter data for the maintenance items displayed on the display means, and storage means for storing the data entered through the input means as maintenance history data; wherein the mobile terminal inputs the operating time or date and time from the data control device via first communication means and stores the maintenance history data in the storage means in association with the input operating time or date and time.

In the present invention, the construction machine includes the data control device that processes the operating time or date and time. When, for instance, the construction machine is to be inspected, the mobile terminal is communication-connected to the data control device via the first communication means so that the data control device inputs the operating time or date and time into the mobile terminal. When the worker uses the input means to enter data (e.g., the data about maintenance execution, maintenance results, countermeasure, or replenishment/replacement amount of oil or the like) for the maintenance items displayed on the display means of the mobile terminal, the entered data is handled as the maintenance history data, associated with the construction machine operating time or date and time, and stored in the storage means. The worker displays the maintenance history data stored in the storage means of the mobile terminal, for instance, on the display means, or outputs it to a management server via second communication means.

In the present invention, the mobile terminal can acquire temporal information, such as the operating time or date and time, from the data control device of the construction machine and store the acquired temporal information about the construction machine in association with the maintenance history data, as described above. As a result, the reliability of the temporal information about the maintenance history data is higher than when, for instance, the temporal information is manually entered into the mobile terminal. Further, since the construction machine's temporal information is used as the reference, the temporal relationship between the maintenance history data and the occurrence of a construction machine abnormality can be determined with increased precision. This makes it possible to perform fault diagnostics more rapidly with increased accuracy.

(2) According to another aspect of the present invention, there is provided the maintenance history information management system as described in (1) above, wherein the data control device stores machine information such as the model name and serial number of the construction machine; and the mobile terminal acquires the machine information from the data control device via the first communication means and stores the acquired machine information in the storage means in association with the maintenance history data.

(3) According to another aspect of the present invention, there is provided the maintenance history information management system as described in (1) above, wherein the control means of the mobile terminal causes the display means to display the maintenance history data stored in the storage means in accordance with an instruction entered by the worker.

(4) According to another aspect of the present invention, there is provided the maintenance history information management system as described in (1) above, further comprising: a management server being positioned far away from the construction machine to input the maintenance history data from the mobile terminal via second communication means and record the input maintenance history data.

(5) According to another aspect of the present invention, there is provided the maintenance history information management system as described in (1) above, wherein the first communication means includes a plurality of communication connectors being provided for maintenance targets of the construction machine and communication-connected to the data control device, and a communication cable for enabling to connect to and disconnect from the communication connectors.

Consequently, it is possible that the mobile terminal is carried in accordance with a maintenance target of the construction machine and connected to the communication connector via the communication cable and received the operating time, date and time, or other similar data from the data control device. Therefore, the data can be entered into the mobile terminal near a maintenance target that is accessed for maintenance purposes. This makes it possible to increase working efficiency.

(6) According to another aspect of the present invention, there is provided the maintenance history information management system as described in (1) above, wherein the control means of the mobile terminal classifies the maintenance items by maintenance intervals and causes the display means to display maintenance items that correspond to maintenance intervals entered by the worker.

(7) According to another aspect of the present invention, there is provided the maintenance history information management system as described in (1) above, wherein the control means of the mobile terminal classifies the maintenance items by maintenance type and causes the display means to display maintenance items that correspond to a maintenance type selectively entered by the worker.

(8) According to another aspect of the present invention, there is provided the maintenance history information management system as described in (1) above, wherein the control means of the mobile terminal classifies the maintenance items by maintenance target and causes the display means to display maintenance items that correspond to a maintenance target selectively entered by the worker.

(9) According to another aspect of the present invention, there is provided the maintenance history information management system as described in (1) above, wherein the input means inputs the data on maintenance execution, maintenance results, countermeasure, or replenishment/replacement amount of oil or the like for the maintenance items as the maintenance history data.

(10) According to another aspect of the present invention, there is provided the maintenance history information management system as described in (9) above, wherein the control means of the mobile terminal has a function of extracting maintenance items, which were found to be nonconforming but are still not remedied or are due for maintenance but have not been inspected, and causing the display means to display the extracted maintenance items

(11) According to another aspect of the present invention, there is provided the maintenance history information management system as described in (10) above, wherein the mobile terminal includes maintenance interval change means for changing maintenance interval settings for the maintenance items.

(12) According to another aspect of the present invention, there is provided the maintenance history information management system as described in (11) above, wherein the maintenance interval change means inputs a basic unit for maintenance intervals and changes the maintenance interval setting to a multiple of the input basic unit that is close to predefined recommended maintenance intervals for a maintenance item.

(13) According to another aspect of the present invention, there is provided the maintenance history information management system as described in (1) above, wherein the control means of the mobile terminal reads the last maintenance history data stored in the storage means and displays data input fields for the maintenance items and the associated last maintenance history data within the same screen.

(14) According to another aspect of the present invention, there is provided the maintenance history information management system as described in (1) above, wherein the control means of the mobile terminal causes the display means to open a screen into which findings other than predetermined maintenance items can be entered; and the storage means handles data input by the input means into the screen opened by the display means as findings data and stores the findings data in association with the operating time or date and time, which is input from the data control device via the first communication means.

(15) In accomplishing the above objects, according to still another aspect of the present invention, there is provided a maintenance history information management system for a construction machine that manages the history information about visual inspection of the construction machine having a plurality of zoned maintenance areas accessible to a worker, the maintenance history information management system comprising: a data control device being incorporated in the construction machine to process operating time or date and time; and a mobile terminal including control means for displaying construction machine maintenance items on display means, input means for enabling the worker to enter data for the maintenance items displayed on the display means, and storage means for storing the data entered through the input means as maintenance history data; wherein the mobile terminal inputs the operating time or date and time from the data control device via first communication means in accordance with a communication instruction from the worker and stores the maintenance history data, which is later input through the input means, in the storage means in association with the input operating time or date and time.

Advantages of the Invention

The present invention can enhance the reliability of temporal information about the maintenance history data and determine the temporal relationship between the maintenance history data and the occurrence of a construction machine abnormality with increased precision.

BRIEF DESCRIPTION OF THE DRAWINGS

FIG. 5B shows the transition of a main screen that is displayed on the monitor when the maintenance input program is started in the mobile terminal.

FIG. 7A shows the transition of a daily maintenance input screen that is displayed on the monitor of the mobile terminal.

FIG. 11 shows an outstanding maintenance input screen that is displayed on the monitor of the mobile terminal.

FIG. 13 shows a replenishment amount input screen that is displayed on the monitor of the mobile terminal.

FIG. 14 shows a machine information screen that is displayed on the monitor of the mobile terminal.

FIG. 15 shows a main screen that is displayed on the monitor when a maintenance history display program is started in the mobile terminal.

FIG. 16A shows the transition of a daily maintenance history screen that is displayed on the monitor of the mobile terminal.

FIG. 17 shows the transition of a monthly maintenance history screen that is displayed on the monitor of the mobile terminal.

FIG. 18 shows a replenishment amount input screen that is displayed on the monitor of the mobile terminal.

FIG. 22 is a findings input screen that is displayed on the monitor of the mobile terminal.

FIG. 23 shows a position input list that is displayed on the monitor of the mobile terminal.

FIG. 24 shows a target input list that is displayed on the monitor of the mobile terminal.

FIG. 25 shows a requested action input screen that is displayed on the monitor of the mobile terminal.

DESCRIPTION OF REFERENCE NUMERALS

1: Hydraulic excavator
30: Data recording device (data control device)
32A, 32B, 32C: Communication connector (first communication means)
33A, 33B: Communication cable (first communication means)
34: Mobile terminal
35: Storage device (storage means)
36: CPU (control means)
38: Monitor (display means)
41: Tablet (input means)
43: Management server
99: Communication cable (second communication means)

BEST MODE FOR CARRYING OUT THE INVENTION

One embodiment of the present invention will now be described with reference to the drawings.

Figure 1:
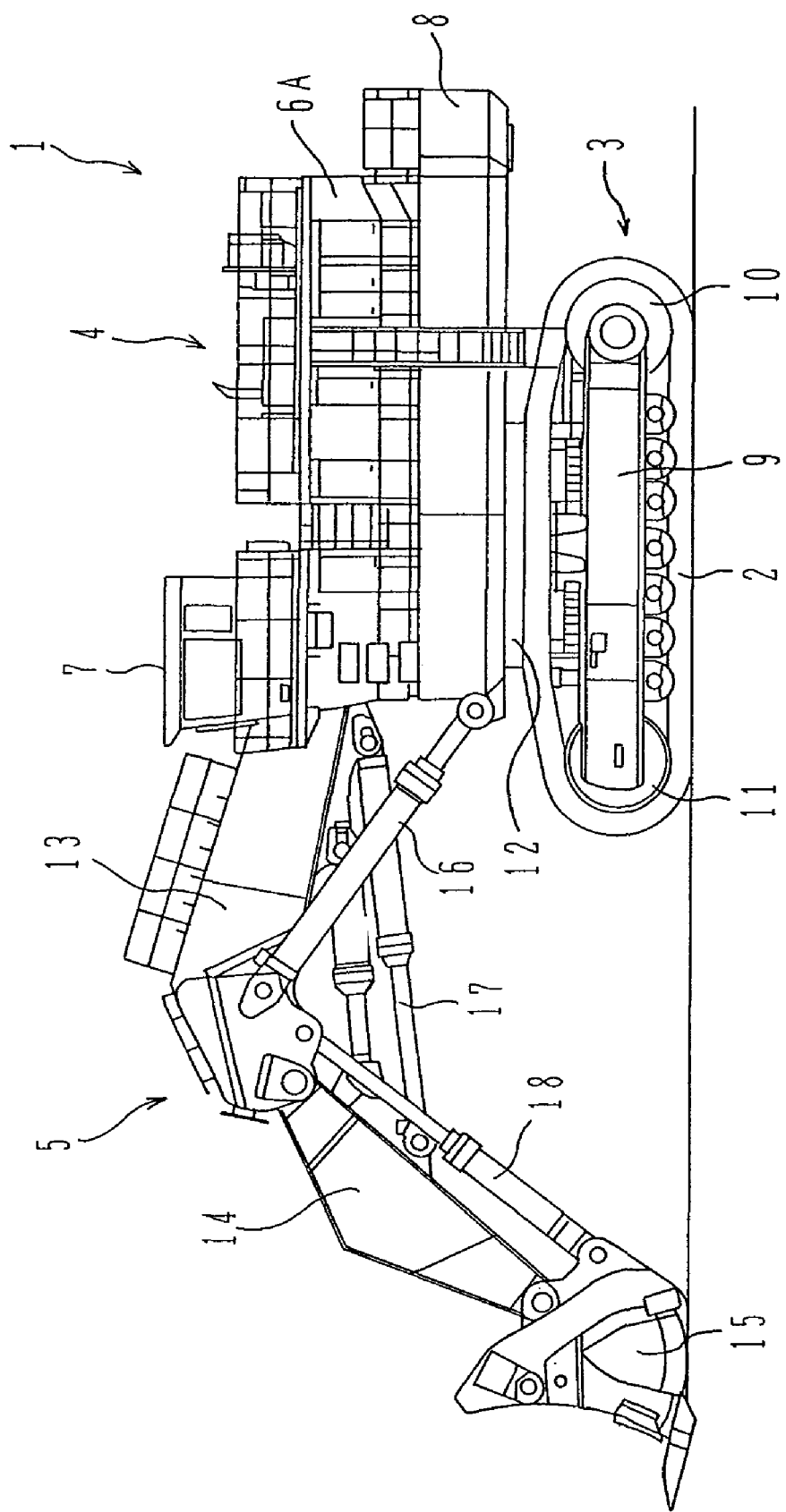
FIG. 1 is a side view illustrating the overall structure of a huge hydraulic excavator to which a construction machine maintenance history information management system according to one embodiment of the present invention is applied.
Figure 2:
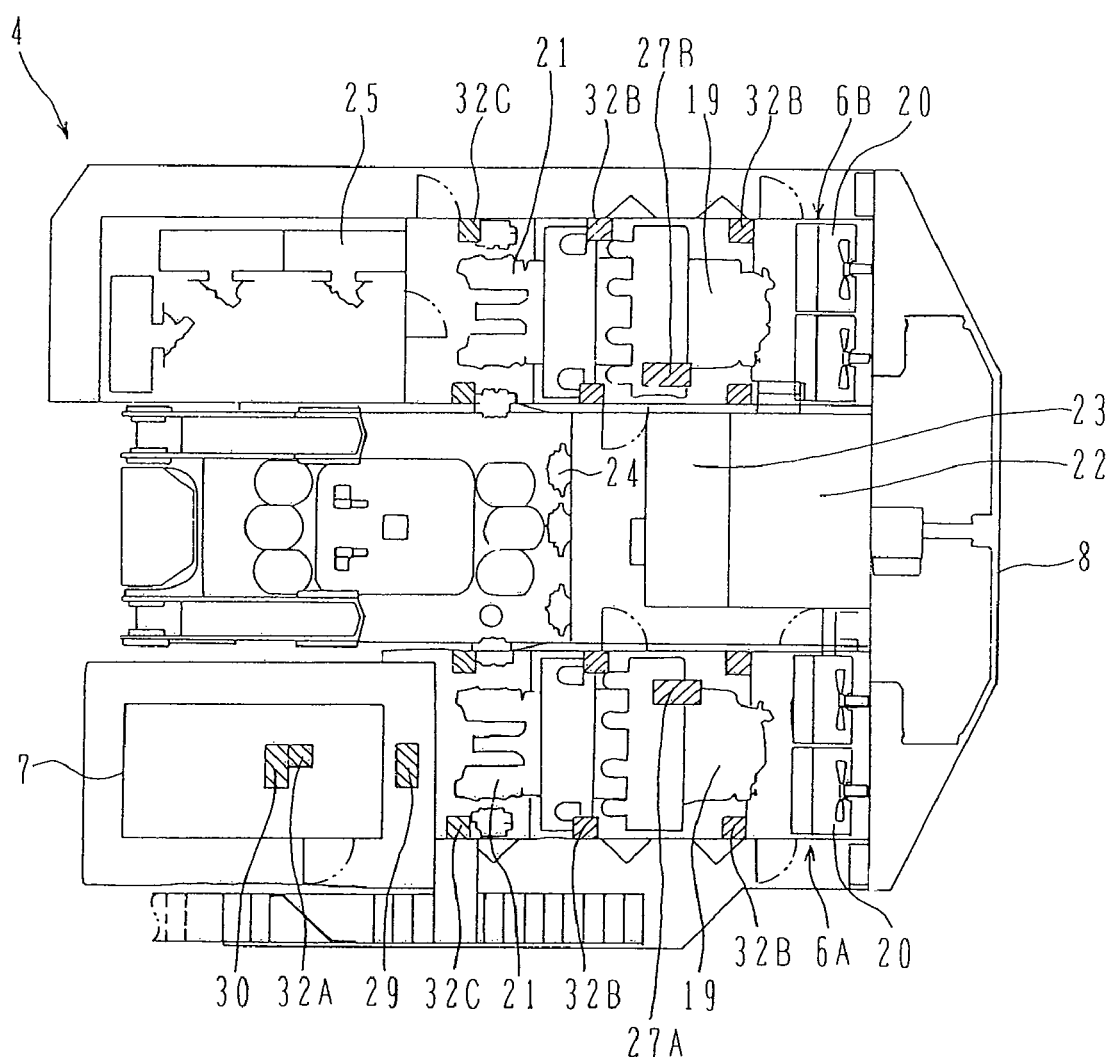
FIG. 2 is a plan view illustrating the device layout of a hydraulic excavator swing body to which the construction machine maintenance history information management system according to one embodiment of the present invention is applied.

FIG. 1 is a side view illustrating the overall structure of a huge hydraulic excavator to which a construction machine maintenance history information management system according to one embodiment of the present invention is applied. FIG. 2 is a plan view illustrating the device layout of a hydraulic excavator swing body. Controller network devices, which will be described later, are hatched in FIG. 2.

The hydraulic excavator 1 shown in FIGS. 1 and 2 is a huge two-engine excavator that weighs several hundred tons and is frequently used, for instance, at an overseas mine. This excavator 1 comprises a track body 3 including left- and right-side caterpillar belts (crawlers) 2, a swing body 4 mounted on the track body 3 in a swingable manner, a front operating mechanism (excavation device) 5 mounted to the front center portion of the swing body 4 in a vertically angularly movable manner, housings 6A, 6B provided in the left and right portions of the swing body 4 to house various devices (described in detail later), a cab 7 positioned to the front upper side of the left-side housing 6A, and a counterweight 8 attached in the rear portion of the swing body 4.

The track body 3 comprises a track frame 9 substantially shaped in the H form, left- and right-side drive wheels 10 which are rotatably supported near the left- and light-side rear ends of the track frame 9, left- and right-side track hydraulic motors (not shown) for driving the drive wheels 10 and left- and right-side idlers 11 which are rotatably supported near the left- and right-side front ends of the track frame 9 and are rotated by driving forces of the drive wheels 10 through the caterpillar belts 2.

A swing wheel (swing body bearing) 12 is disposed between the track body 3 and swing body 4. A swing hydraulic motor (not shown) is disposed toward the inner circumference of the swing wheel 12. The swing hydraulic motor is driven so that the swing body 4 swings relative to the track body 3.

The front operating mechanism 5 is, for instance, of a loader type. It comprises a boom 13 turnably mounted on the swing body 3, an arm 14 turnably mounted on the leading end of the boom 13, and a bucket 15 turnably mounted on the leading end of the arm 14. The boom 13, arm 14, and bucket 15 are operated respectively by telescopic motions of boom hydraulic cylinders 16, arm hydraulic cylinders 17, and bucket hydraulic cylinders 18.

The housings 6A, 6B house engines 19, radiators 20 positioned behind the engines 19, and hydraulic pumps 21 positioned in front of the engines 19. The hydraulic pumps 21 are driven by the engines 19 to supply hydraulic oil to a plurality of hydraulic actuators (e.g., the aforementioned track hydraulic motors, swing hydraulic motor, boom hydraulic cylinders 16, arm hydraulic cylinders 17, and bucket hydraulic cylinders 18).

A fuel tank 22 for storing fuel for the engines 19 and a hydraulic oil tank 23 for storing hydraulic oil for the hydraulic pumps 21 are positioned between the housings 6A, 6B. A plurality of control valves 24 are positioned in front of the hydraulic oil tank 23 to control the hydraulic oil flow from the hydraulic pumps 21 to the aforementioned hydraulic actuators in accordance with the operation of control levers (not shown) in the cab 7. oil coolers 25 for and a lubricator (not shown) are positioned in front area of the right-side housing 6B. The oil coolers 25 cool the fluid that returns from the hydraulic actuators. The lubricator supplies lubricating oil, for instance, to the swing wheel 12 and the movable sections of the front operating mechanism 5.

Figure 3:
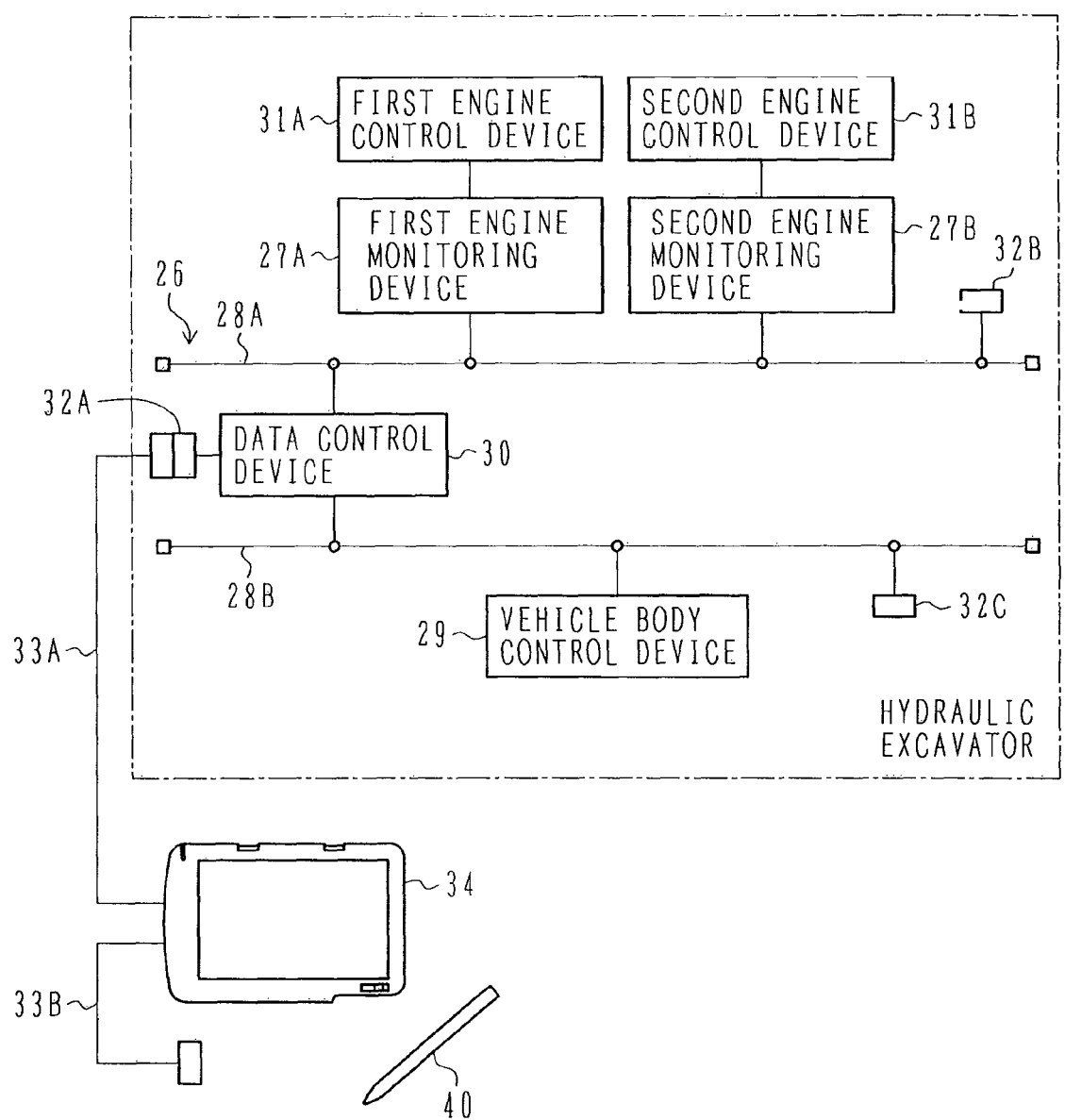
FIG. 3 is a schematic diagram that illustrates the construction machine maintenance history information management system according to one embodiment of the present invention while depicting the configuration of a hydraulic excavator controller network.

In the hydraulic excavator 1 configured as described above, there is mounted a controller network 26 for collecting operation data, which is the data about the operating status of each maintenance target. FIG. 3 is a schematic diagram that illustrates the configuration of the controller network 26 while depicting one embodiment of the construction machine maintenance history information management system according to the present invention.

Referring to FIG. 3 and FIG. 2, the controller network 26 comprises a first network 28A connected to engine monitoring devices 27A, 27B or the like, a second network 28B connected to a vehicle body control device 29 or the like, and a data recording device (data control device) 30 connected to these networks 28A, 28B.

The engine monitoring devices 27A, 27B are connected respectively to engine control devices 31A, 31B for controlling the two engines 19. Although the details of the engine control devices 31A, 31B are not depicted, the engine control devices 31A, 31B input, for instance, the engine speeds detected by revolution speed sensors and the governor rack positions detected by position sensors, and control fuel injection devices to regulate the fuel injection amounts of the engines 19. Although the details of the engine monitoring devices 27A, 27B are not depicted, the engine monitoring devices 27A, 27B input, for instance, the blow-by pressures of the engines 19 detected by pressure sensors and the cooling water temperatures of the radiators 20 detected by temperature sensors. The operation data about the operating status of the engines 19 (hereinafter referred to as the engine-related data), which is input into the engine control devices 31A, 31B and engine monitoring devices 27A, 27B, is output to the data recording device 30 through the first network 28A.

The vehicle body control device 29 controls the vehicle body of the hydraulic excavator 1 and detects the operation data about the vehicle body. Although the details of the vehicle body control device 29 are not depicted, the vehicle body control device 29 exercises so-called total horsepower control by inputting the engine speeds detected by the revolution speed sensors and controlling the delivery rate of the hydraulic pumps 21 in accordance with the engine speeds to ensure that the total input torque of the hydraulic pump 21 is not greater than the engine output torque. Further, the vehicle body control device 29 inputs the hydraulic oil temperature detected by a oil temperature sensor and controls cooling fan motors for the oil coolers 25 to ensure that the hydraulic oil temperature is constant. Furthermore, the vehicle body control device 29 inputs, for instance, the ON/OFF signal of a key switch (not shown) that operates to drive the engines 19. The operation data about the vehicle body of the hydraulic excavator 1 (hereinafter referred to as the vehicle body related data), which is input into the vehicle body control device 29, etc., is output to the data recording device 30 through the second network 28B.

The data recording device 30 inputs and records the aforementioned engine related data and vehicle body related data. Further, the data recording device 30 judges whether the engines 19 are running (e.g., the data recording device 30 may read the engine speed related data and judge whether the read engine speeds are higher than a predetermined engine speed or read key switch ON/OFF data and judge whether the key switch is ON), and computes the operating time (hour meter) of the engines 19 by making use of the temporal information of a timer, and records the computed operating time in association with the date and time (international standard time) that is constantly corrected based on the time indicated by a GPS device (not shown). It should be noted that the data recording device 30 records an operating time initial value that prevails when the hydraulic excavator 1 is delivered.

The controller network 26 also comprises a plurality of communication connectors 32A, 32B, 32C. The communication connector 32A is connected to the data recording device 30 and positioned within the cab together with the data control device 30. The plurality of communication connectors 32B (eight connectors in FIG. 2) are connected to the first network 28A and positioned in engine chambers within the housings 6A, 6B together with the engine monitoring devices 27A, 27B. The plurality of communication connectors 32C (four connectors in FIG. 2) are connected to the second network 28B and positioned in pump chambers within the housings 6A, 6B together with the vehicle body control device 29. A mobile terminal 34 is included as a major feature of the present embodiment. The mobile terminal 34 can be communication-connected via a communication cable 33A for connecting to and disconnecting from the communication connector 32A, or a communication cable 33B for connecting to and disconnecting from the plurality of communication connectors 32B, 32C. The mobile terminal 34 mainly inputs data (e.g., the data about maintenance execution, maintenance results, countermeasure, or replenishment/replacement amount of oil or the like) on a plurality of maintenance items for the hydraulic excavator 1 and creates maintenance history data.

Figure 4:
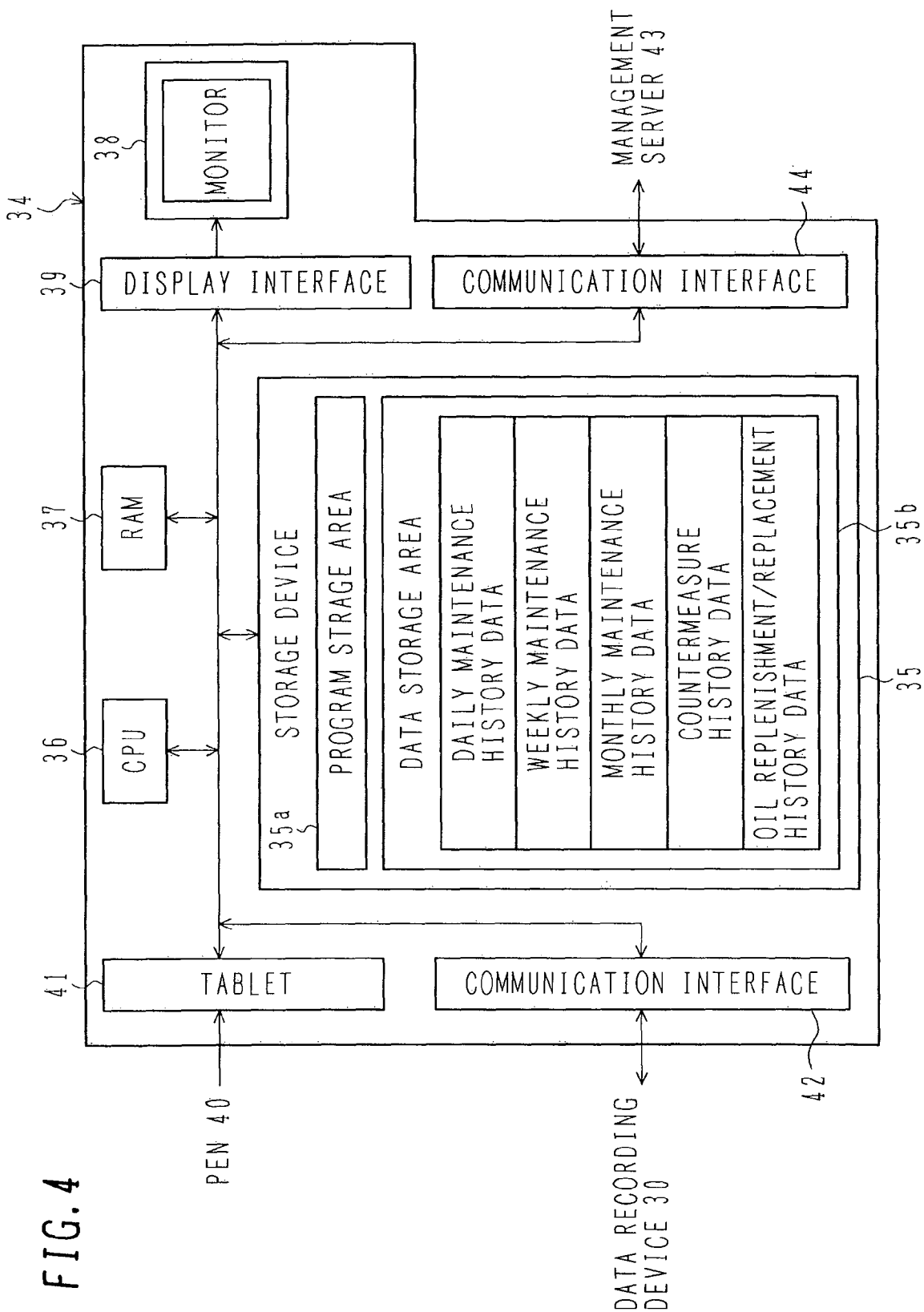
FIG. 4 is a block diagram illustrating the functional configuration of a mobile terminal that is a part of the construction machine maintenance history information management system according to one embodiment of the present invention.

The functions of the mobile terminal 34, which is an essential part of the present embodiment, will now be described in detail. FIG. 4 is a block diagram illustrating the functional configuration of the mobile terminal 34.

Referring to FIG. 4, the mobile terminal 34 is, for instance, a tablet personal computer. The mobile terminal 34 comprises a storage device 35 (storage means) for storing control programs and maintenance history data, etc., a CPU 36 (control means) for performing arithmetic processing in accordance with the control programs stored in the storage device 35, a RAM 37 for temporarily storing data that is arithmetically processed by the CPU 36, a monitor 38 (display means), a display interface 39 for outputting a display signal to the monitor 38, a tablet 41 (input means) provided in front face of the monitor 38 to detect the contact of a pen 40 manipulated by a worker, a communication interface 42 for inputting data from the data recording device 30 via the communication cables 33, and a communication interface 44 for performing data input/output operations in relation, for instance, to a management server 43 (see FIG. 21) as described later.

The storage device 35 of the mobile terminal 34 has a program storage area 35a and a data storage area 35b. The program storage area 35a stores the control programs (e.g., maintenance input program, maintenance history display program, maintenance interval setup program, and option setup program). The data storage area 35b stores, for instance, the maintenance history data (e.g., daily maintenance history, weekly maintenance history, monthly maintenance history, requested action history, countermeasure history, oil replenishment/replacement history, and findings) created by the maintenance input program and setup data that is set by the maintenance interval setup program and option setup program. In the present embodiment, the maintenance input program can be started only by a worker who performs maintenance tasks. The maintenance interval setup program and option setup program can be started only an administrator who is privileged, for instance, to change the settings. The maintenance history display program can be started by the worker and administrator. The control process performed by each control program will be described in detail below.

(1) Maintenance Input

Figure 5A:
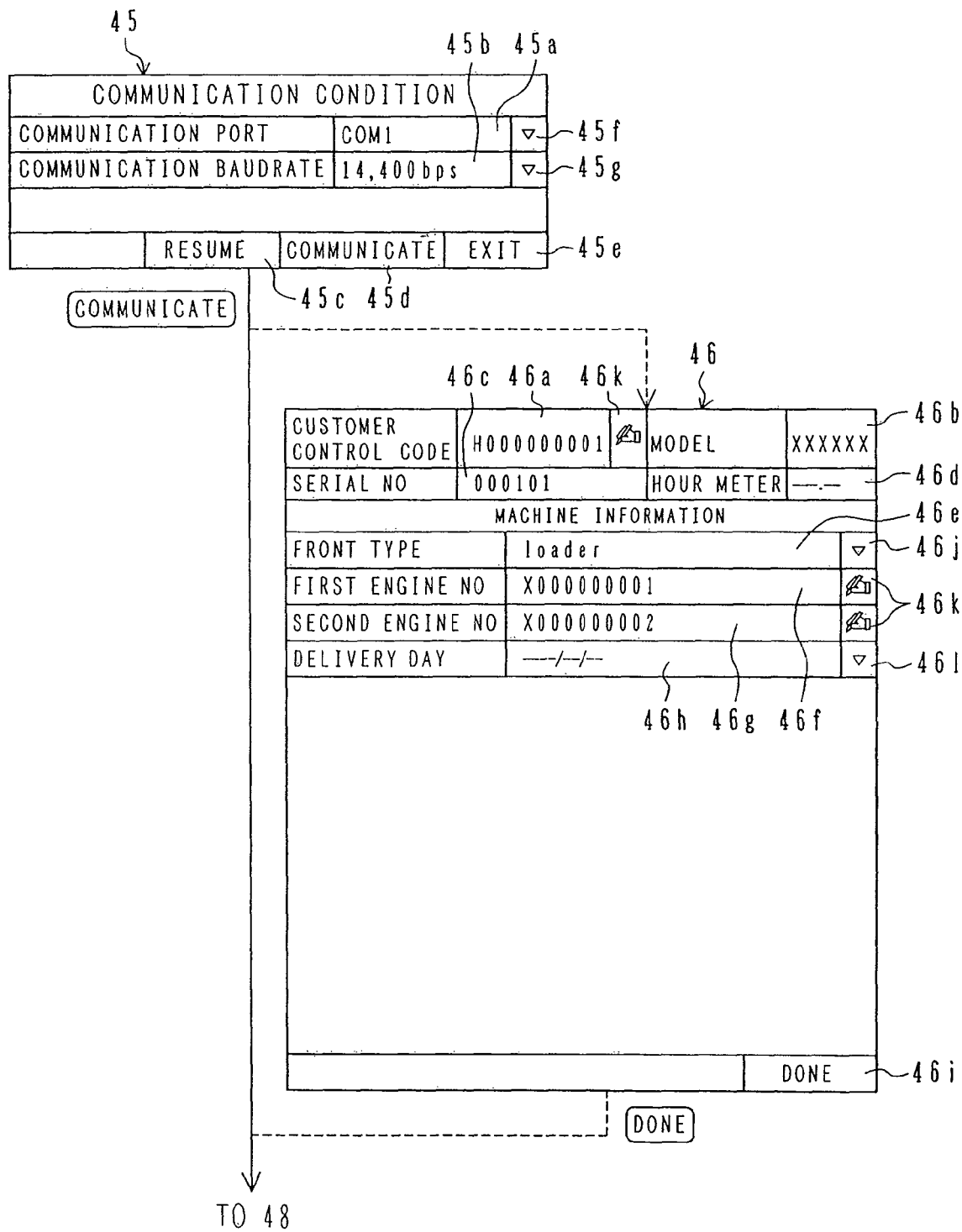
FIG. 5A shows the transition of a main screen that is displayed on a monitor when a maintenance input program is started in the mobile terminal.

FIGS. 5A and 5B show the transitions of a main screen that is displayed on the monitor 38 when the maintenance input program is started.

When the maintenance input program starts, a communication condition input screen 45 is displayed on the monitor 38 as shown in FIGS. 5A and 5B. The communication condition input screen 45 has a communication port input field 45a, a communication baud rate input field 45b, a resume button 45c, a communication button 45d, and an exit button 45e.

List display buttons 45f, 45g are positioned to the right of the communication port input field 45a and communication baud rate input field 45b. When the worker operates the list display button (45f or 45g) (by bringing the pen 40 into contact with the associated display area), an input list (not shown), which lists a plurality of input terms, appears. More specifically, when the worker operates the list display button 45f, an input list (not shown) appears to list, for instance, "COM1", "COM2", and so on. When the worker selects, for instance, "COM1" from the input list, the input list closes, and "COM1" is entered into the communication port input field 45a. When the worker operates the input list display button 45g, an input list (not shown) appears to list, for instance, "14,400 bps", "28,800 bps", and so on. When the worker selects, for instance, "14,400 bps" from the input list, the input list closes, and "14,400 bps" is entered into the communication baud rate input field 45b.

When the worker operates the communication button 45d in the communication condition input screen 45, the communication between the data recording device 30 and mobile terminal 34 starts under the communication conditions entered in the communication port input field 45a and communication baud rate input field 45b, and the displayed screen is changed to a machine information input screen 46. In this instance, data such as the model name and serial number of the hydraulic excavator 1, the operating time initial value prevailing at the time of delivery, and the operating time and date/time (international standard time) acquired at the beginning of communication is input from the data recording device 30 to the mobile terminal 34. If the communication between the data recording device 30 and mobile terminal 34 cannot be established for some reason, the worker can operate the resume button 45c in the communication condition input screen 45 to change the displayed screen in a state where the communication is not established. Operating the exit button 45e in the communication condition input screen 45 terminates the maintenance input program.

The machine information input screen 46 has a customer code input field 46a, a hydraulic excavator model name display field 46b, a hydraulic excavator serial number display field 46c, a hydraulic excavator operating time display field 46d, a front operating mechanism type input field 46e, engine identification number input fields 46f, 46g, a hydraulic excavator delivery date input field 46h, and an execution button 46i. The data (the model name and serial number of the hydraulic excavator 1 and the operating time prevailing at the beginning of communication) acquired from the data recording device 30 is displayed in the model name display field 46b, serial number display field 46c, and operating time display field 46d.

Figure 6:
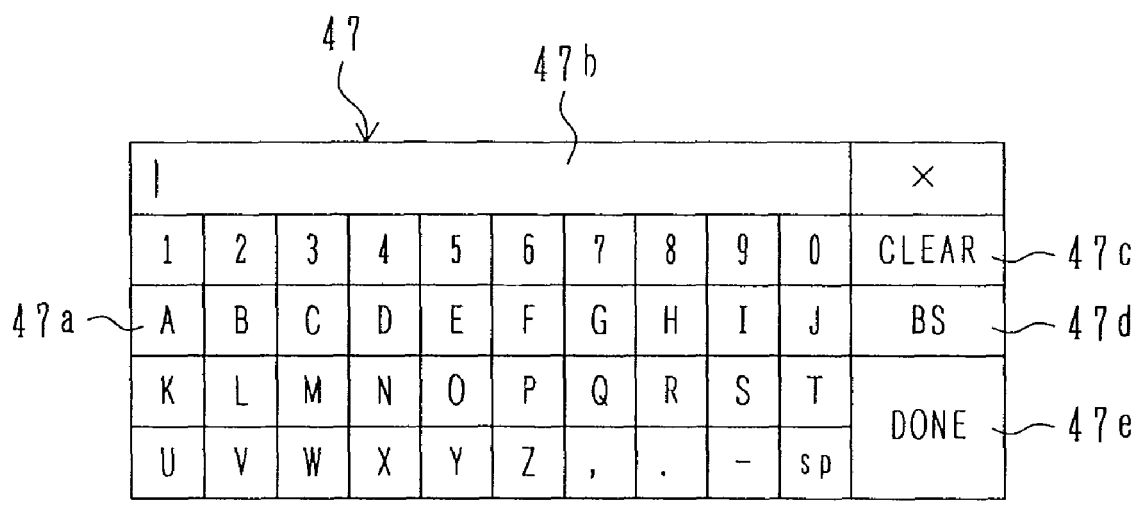
FIG. 6 shows a keyboard dialog screen for input that is displayed on the monitor of the mobile terminal.

A list display button 46j is positioned to the right of the front operating mechanism type input field 46e. When the worker operates the list display button 46j, an input list (not shown) appears to list, for instance, "loader", "backhoe", and so on. When the worker selects, for instance, "loader" from the input list, the input list closes, and "loader" is entered into the front operating mechanism type input field 46e.

keyboard display buttons 46k are positioned to the right of the customer code input field 46a and engine identification number input fields 46f, 46g. When the worker operates the keyboard display button 46k, a keyboard dialog screen 47 shown in FIG. 6 appears. The keyboard dialog screen 47 has, for instance, a plurality of input buttons 47a (e.g., "0" to "9"

and "A" to "Z"), a display field 47b for displaying characters entered through the input buttons 47a, a clear button 47c for deleting all the characters displayed in the display field 47b, a backspace button 47d for deleting the last character, and an execution button 47e. When the worker displays input characters in the display field 47b by operating the input buttons 47a in the keyboard dialog screen 47 and then operates the execution button 47e, the keyboard dialog screen 47 closes, and text data is entered into the customer code input field 46a or engine identification number input fields 46f, 46g.

A calendar display button 46l is positioned to the right of the delivery date input field 46h. When the worker operates the calendar display button 46l, a calendar dialog screen (not shown) appears. The calendar dialog screen lists the days of a month and allows the worker to switch the list from one month to another. When the worker selects a particular date from the calendar dialog screen, the calendar dialog screen closes, and date data (e.g., in year/month/day format) is entered into the delivery date input field 46h.

When the worker operates the execution button 46i in the machine information input screen 46, the storage device 35 stores machine data (the aforementioned customer code, hydraulic excavator model name and serial number, operating time initial value prevailing at the time of delivery, type of the front operating mechanism 5, identification numbers of the engines 19, and delivery date), and the displayed screen is changed to a maintenance information input screen 48. After the machine data is stored in the storage device 35, the machine information input screen 46 is skipped. More specifically, when the worker operates the communication button 45d in the communication condition input screen 45, a check is performed to determine whether the serial number acquired from the data recording device 30 is included in the machine data stored in the storage device 35. If the associated machine data is found, the data is read, and the displayed screen is changed to the maintenance information input screen 48.

The maintenance information input screen 48 has a customer code display field 48a, a model name display field 48b, a serial number display field 48c, an operating time display field 48d, a maintenance date/time display field 48e, a name input field 48f for entering the name of the maintenance personnel, and an execution button 48g. The customer code display field 48a, model name display field 48b, serial number display field 48c, and operating time display field 48d display some of the machine data stored in the storage device 35 (customer code and hydraulic excavator model name and serial number) and the operating time prevailing at the beginning of communication. The maintenance date/time display field 48e displays local time (described in detail later in conjunction with the option setup program) that is obtained by converting the date/time (international standard time) prevailing at the beginning of communication, which is acquired from the data recording device 30.

A keyboard display button 48h and a list display button 48i are positioned to the right of the name input field 48f. When the worker operates the keyboard display button 48h, the keyboard dialog screen 47 appears. A name is input into the name input field 48f when the keyboard dialog screen 47 is operated as described above. On the other hand, when the worker operates the list display button 48i, an input list (not shown) appears to list a plurality of names (e.g., preselected or previously stored names). When the worker selects a name from the input list, the input list closes, and the selected name is entered into the name input field 48f.

When the worker operates the execution button 48g in the maintenance information input screen 48, the storage device 35 stores maintenance data (the aforementioned operating time and date/time (international standard time) prevailing at the beginning of communication and the name of the maintenance personnel), and the displayed screen is changed to a maintenance input main menu screen 49.

The maintenance input main menu screen 49 has a basic information display area 50 and a menu display area 51. The basic information display area 50 has a customer code display field 50a, a model information display field 50b, a serial number display field 50c, an operating time display field 50d, a maintenance date/time display field 50e, and a name display field 50f, and displays some of the aforementioned machine data as well as the maintenance data. The menu display area 51 has a machine information button 51a, a daily/weekly maintenance button 51b, a monthly maintenance button 51c, an outstanding maintenance button 51d, a replenishment button 51e, a requested action button 51g, and an exit button 51f.

When the daily/weekly maintenance button 51a in the maintenance input main menu screen 49 is operated, the displayed screen is changed to a daily/weekly maintenance input menu screen 52 shown in FIG. 7A. The daily/weekly maintenance input menu screen 52 has the basic information display area 50 and a menu display area 53. The menu display area 53 has a daily maintenance button 53a, a weekly maintenance button 53b, a replenishment/replacement amount button 53c, a new findings button 53e, and a main menu button 53d.

When the worker operates the daily maintenance button 53a in the daily/weekly maintenance input menu screen 52, the displayed screen is changed to a daily maintenance input screen 54. The daily maintenance input screen 54 has the basic information display area 50, a maintenance input area 55, an execution button 54a, and a new findings button 54b. The maintenance input area 55 displays maintenance tasks that are to be performed daily (e.g., at intervals of 10 operating hours of the hydraulic excavator 1, that is, each time the hydraulic excavator operator changes).

Figure 7B:
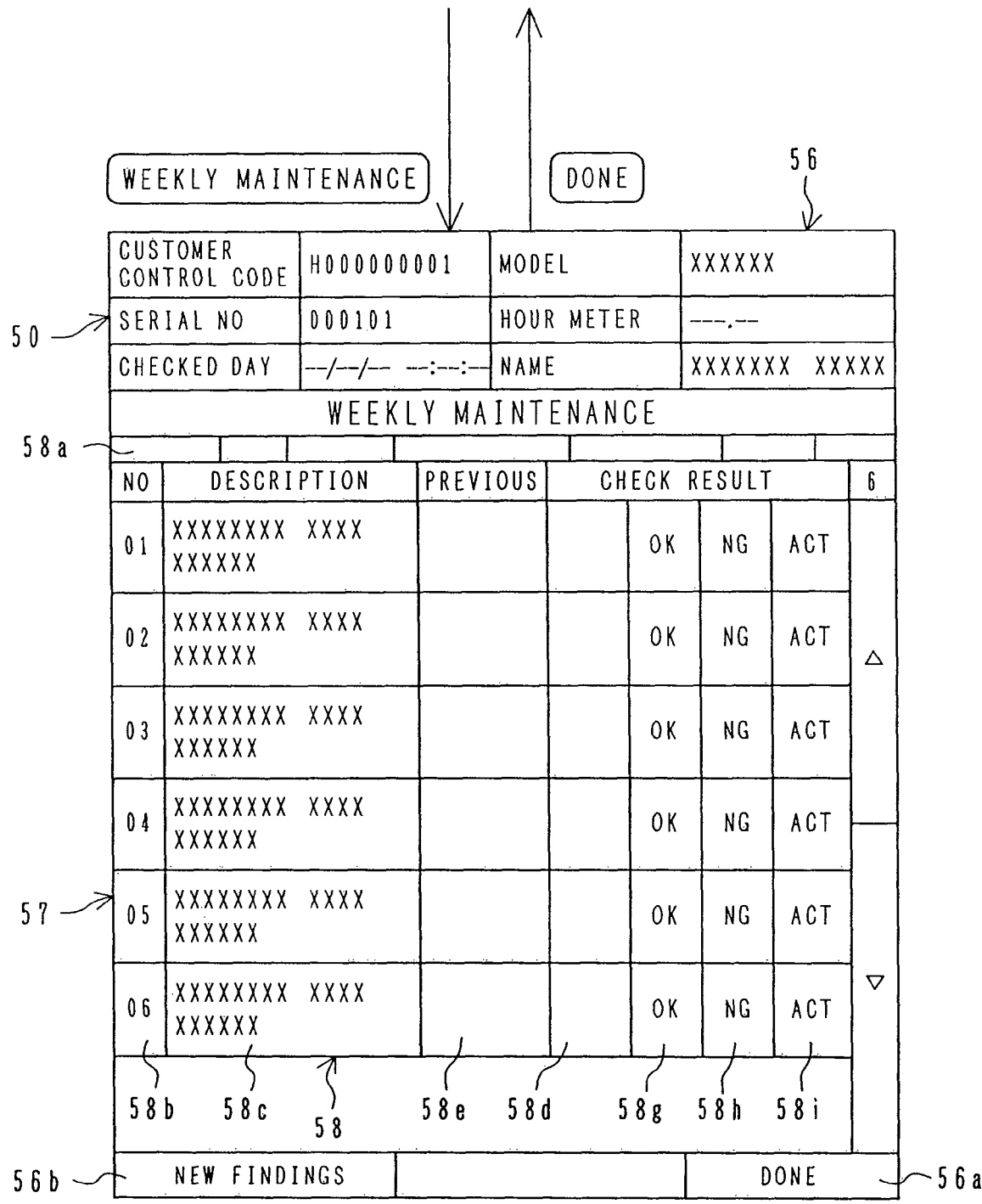
FIG. 7B shows a weekly maintenance input screen that is displayed on the monitor of the mobile terminal.

When the worker operates the weekly maintenance button 53b in the daily/weekly maintenance input menu screen 52, the displayed screen is changed to a weekly maintenance input screen 56 (see FIG. 7B). The weekly maintenance input screen 56 has the basic information display area 50, a maintenance input area 57, an execution button 56a, and a new findings button 56b. The maintenance input area 57 displays maintenance tasks that are to be performed weekly (e.g., at intervals of 50 operating hours of the hydraulic excavator 1).

The maintenance input area 55 of the daily maintenance input screen 54 and the maintenance input area 57 of the weekly maintenance input screen 56 both have a plurality of sheets 58 that displays a list of maintenance items classified by maintenance type (cleaning, oil draining, greasing, level inspection, visual inspection, etc.). When the tab 58a of a sheet 58 indicating a maintenance type is operated, the corresponding sheet 58 is selected and displayed. The sheet 58 has an item number button 58b, an item description display field 58c, a data input field 58d, and a previous data display field 58e for each maintenance item. When the worker operates the item number button 58b, the associated maintenance target display screen (e.g., the overall view or enlarged detail view (not shown) of the hydraulic excavator 1, which indicates a maintenance target) appears. This enables the worker to perform a maintenance task while confirming a maintenance target.

Figure 8:
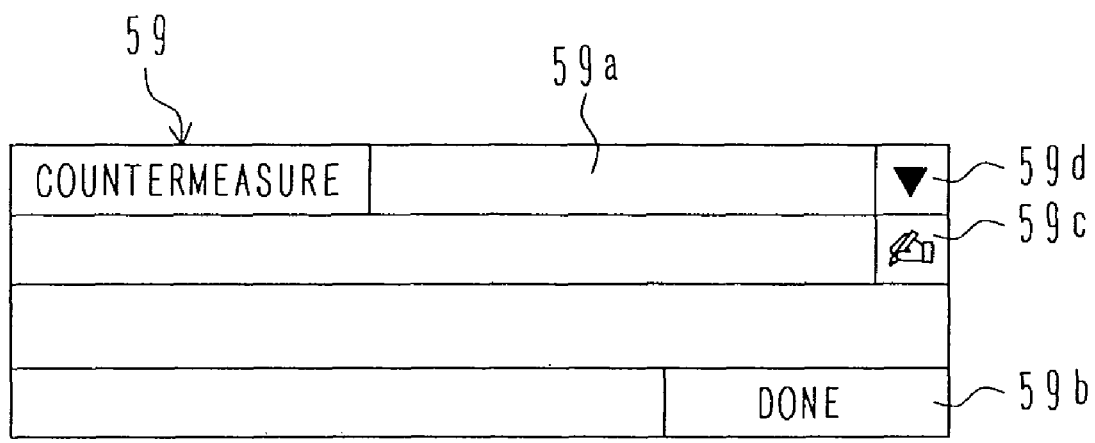
FIG. 8 shows a countermeasure input screen that is displayed on the monitor of the mobile terminal.

The worker can enter data into the data input field 58d while viewing the previous data display field 58e. A "YES" button 58f is provided for a maintenance item (e.g., a maintenance item related to cleaning) which only maintenance execution data is input to. When the worker operates the "YES" button 58*f*, the word "YES" is entered into the data input field 58*d* to indicate that a maintenance task is performed. An "OK" button 58*g*, an "NG" button 58*h*, and an "ACT" button 58*i* are provided for a maintenance item (e.g., a maintenance item related to level inspection) which a maintenance result or the like is input. When the worker operates the "OK" button 58*g*, the word "OK" is entered into the data input field 58*d* to indicate that an acceptable maintenance result is obtained. On the other hand, when the worker operates the "NG" button 58*h*, the word "NG" is entered into the data input field 58*d* to indicate that an unacceptable maintenance result is obtained (a problem is encountered and not corrected). If the worker operates the "ACT" button 58*i* when any remedial action is taken after an unacceptable maintenance result is obtained, a countermeasure input screen 59 shown in FIG. 8 appears.

The countermeasure input screen 59 has a countermeasure input field 59*a* and an execution button 59*b*. A keyboard display button 59*c* and a list display button 59*d* are positioned to the right of the countermeasure input field 59*a*. When the worker operates the keyboard display button 59*c*, the keyboard dialog screen 47 appears. A countermeasure is input into the countermeasure input field 59*a* when the keyboard dialog screen 47 is operated as described above. On the other hand, when the worker operates the list display button 59*d*, an input list (not shown) appears to list, for instance, "ADJUSTED", "REPAIRED", "REPLACED", "REFILLED", or other countermeasure. When the worker selects a countermeasure from the input list, the input list closes, and the selected countermeasure is entered into the countermeasure input field 59*a*. When the worker subsequently operates the execution button 59*b* in the countermeasure input screen 59, a combination of the maintenance item and the countermeasure input in the countermeasure input field 59*a* is handled as countermeasure history data and stored in the storage device 35 in association with the machine data and maintenance data. Further, the countermeasure input screen 59 closes, and the word "ACT" is entered into the data input field 58*d* to indicate that remedial action is taken. If the data input field 58*d* is blank, it means that no maintenance has been performed.

When the worker operates the execution button 54*a* in the daily maintenance input screen 54, a combination of the maintenance item in the daily maintenance input screen 54 and the data input in the data input field 58*d* is handled as daily maintenance history data and stored in the storage device 35 in association with the machine data and maintenance data. Further, the displayed screen is returned to the daily/weekly maintenance input menu screen 52. Similarly, when the worker operates the execution button 56*a* in the weekly maintenance input screen 56, a combination of the maintenance item in the weekly maintenance input screen 56 and the data input in the data input field 58*d* is handled as weekly maintenance history data and stored in the storage device 35 in association with the machine data and maintenance data. Further, the displayed screen is returned to the daily/weekly maintenance input menu screen 52.

Figure 7C:
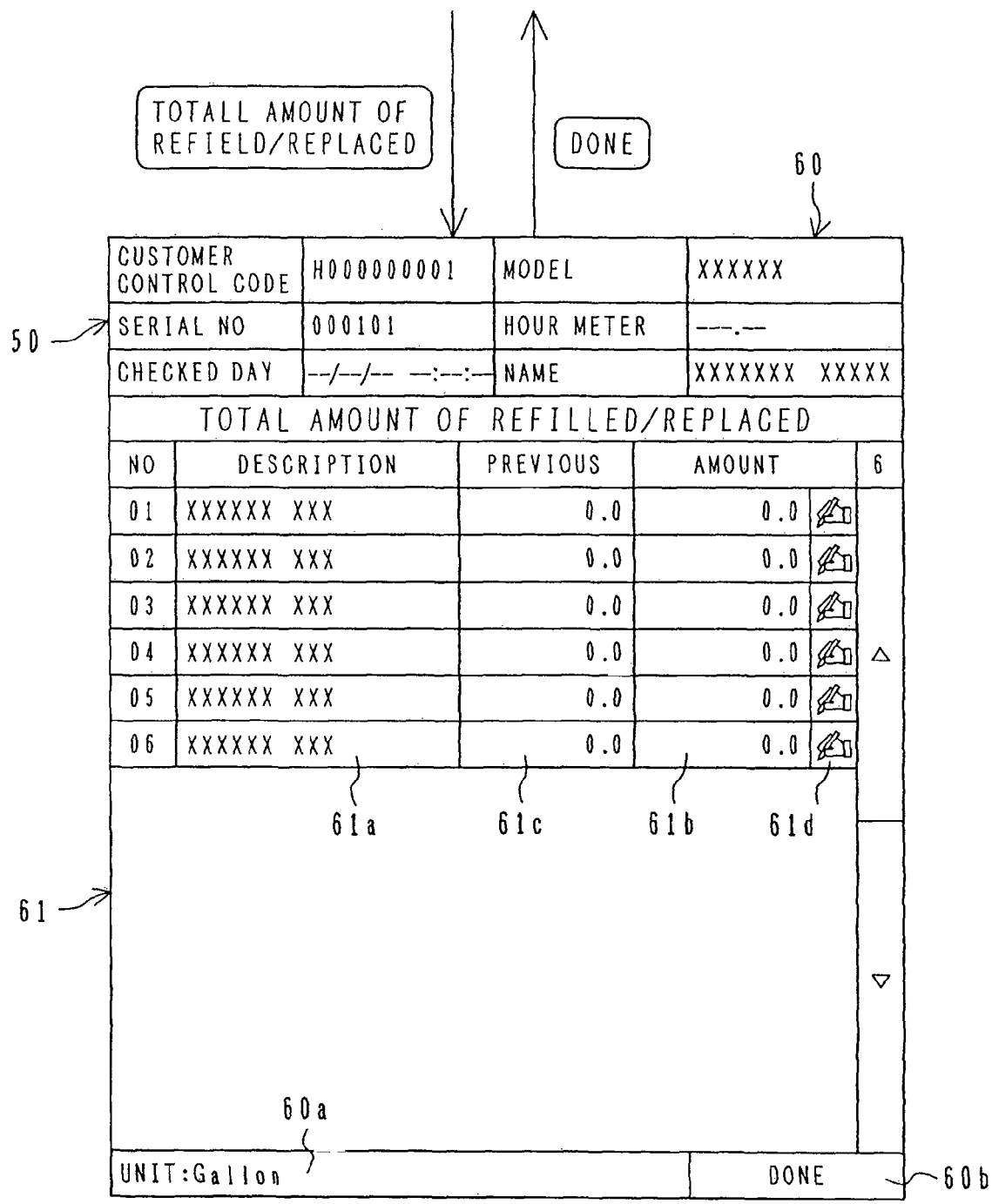
FIG. 7C shows a replenishment/replacement amount input screen that is displayed on the monitor of the mobile terminal.

When the worker operates the replenishment/replacement amount button 53*c* in the daily/weekly maintenance input menu screen 52, the displayed screen is changed to a replenishment/replacement amount input screen 60 (see FIG. 7C). The replenishment/replacement amount input screen 60 has the basic information display area 50, a replenishment/replacement amount input area 61, an amount unit display field 60*a*, and an execution button 60*b*. The amount unit display field 60*a* shows a unit that is selected by the option setup program as described later. The replenishment/replacement amount input area 61 displays a plurality of oil items (engine oil, gear oil, hydraulic oil, water, grease, fuel, etc.) that is to be replenished and replaced. A name display field 61*a*, a data input field 61*b*, and a previous data display field 61*c* are provided for each oil item.

Figure 9:
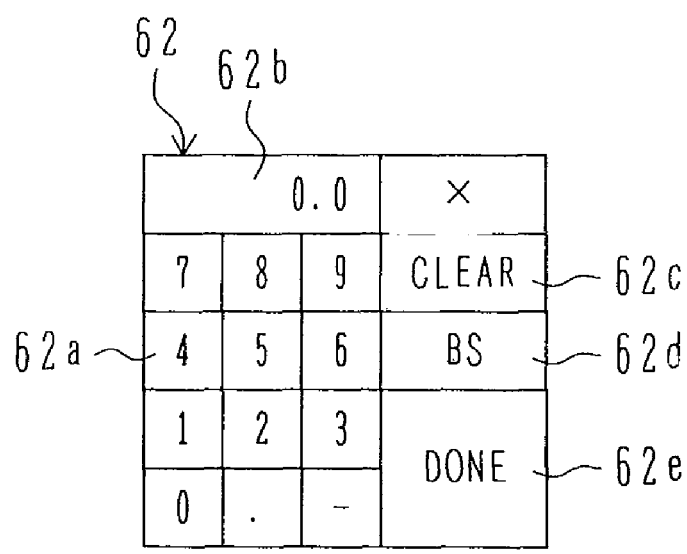
FIG. 9 shows a numeric keypad dialog screen for input that is displayed on the monitor of the mobile terminal.

The worker can enter data into the data input field 61*b* while viewing the previous data display field 61*c*. A numeric keypad display button 61*d* is positioned to the right of the data input field 61*b*. When the worker operates the numeric keypad display button 61*d*, a numeric keypad dialog screen 62 shown in FIG. 9 appears. The numeric keypad dialog screen 62 has a plurality of input buttons 62*a* (e.g., "0" to "9"), a display field 62*b* for displaying a numerical value input through the input buttons 62*a*, a clear button 62*c* for deleting all numerals displayed in the display field 62*b*, a backspace button 62*d* for deleting the last numeral, and an execution button 62*e*. When the worker operates the execution button 62*e* after operating the input buttons 62*a* in the numeric keypad dialog screen 62 to display an input numerical value in the display field 62*b*, the numeric keypad dialog screen 62 closes, and the numerical value is entered into the data input field 61*b*.

When the worker operates the execution button 60*b* in the replenishment/replacement amount input screen 60, a combination of the oil item and the numerical value input in the data input field 61*b* (and the unit displayed in the amount unit display field 60*a*) is handled as replenishment/replacement history data and stored in the storage device 35 in association with the machine data and maintenance data. Further, the displayed screen is returned to the daily/weekly maintenance input menu screen 52. Furthermore, when the main menu button 53*d* in the daily/weekly maintenance input menu screen 52 is operated, the displayed screen is returned to the maintenance input main menu screen 49.

When the worker operates the new findings button 53*e* in the daily/weekly maintenance input menu screen 52, the new findings button 54*b* in the daily maintenance input screen 54, or the new findings button 56*b* in the weekly maintenance input screen 56, the displayed screen is changed to a new findings input screen 103 shown in FIG. 22. Also, when the worker operates a new findings button 64*c* in a monthly maintenance input menu screen 63 (see FIG. 10A), a new findings button 65*b* in a monthly maintenance input screen 65A, 65B (see FIGS. 10A and 10B), or a new findings button 68*b* in an outstanding maintenance input screen 68 (see FIG. 11), which will be described later, the displayed screen is changed to the new findings input screen 103. The new findings input screen 103 has the basic information display area 50, a new findings input area 104, a back button 103*a*, and a main menu button 103*b*. The new findings input area 104 has a location input field 104*a*, a part input field 104*b*, a symptom input field 104*c*, a damage level input field 104*d*, a picture input field 104*e*, a countermeasure input field 104*f*, a replacement part input field 104*g*, a comment input field 104*h*, a save button 104*i*, a recall button 104*j*, a clear button 104*k*, and a submit button 104*l*.

A list display button 104*m* and a picture display button 104*n* are positioned to the right of the location input field 104*a*. When the worker operates the list display button 104*m*, a first input list appears, for instance, to list the locations of first items shown in FIG. 23. When the worker selects a location from the first input list, a second input list appears to list the detailed locations (second item locations) of the selected first item location. When the worker selects a location from the second input list, the second input list closes, and the location selected from the first and second item listings is entered into the location input field 104*a*. On the other hand, when the worker operates the picture display button 104*n*, the overall view (not shown) of the hydraulic excavator appears. When the worker selects the location of a first item, which is described above, from the overall view of the hydraulic excavator, an enlarged detail view representing the selected location appears. When the worker selects a detailed location (the location of a second item as described above) from the enlarged detail view, the enlarged detail view disappears, and the selected location is entered into the location input field 104*a*.

A list display button 104*o* is positioned to the right of the part input field 104*b*. When the worker operates the list display button 104*o*, a first input list appears, for instance, to list categories of the first item shown in FIG. 24. When the worker selects one of the categories (e.g., electrical part, component, or others) in the first input list, a second input list appears to list parts belonging to the selected category. When the worker selects one of the parts in the second input list, the second input list closes, and the part selected from the second item is entered into the part input field 104*b*. If the worker selects and operates a category (e.g., hose, frame, welded portion, or wire) of the first item not corresponding to the second item in the first input list, the transition to the second input list is not performed. In addition, the first input list closes, and the category selected from the first item is entered into the part input field 104*b*.

A list display button 104*p* is positioned to the right of the symptom input field 104*c*. When the worker operates the list display button 104*p*, an input list appears to list various symptoms such as a scratch, crack, leak, clog, burst, looseness, malfunction, short circuit, and open circuit. When the worker selects a symptom from the input list, the input list closes, and the selected symptom is entered into the symptom input field 104*b*.

In the damage level input field 104*d*, selectable levels such as "Heavy", "Light", "Fair", and "Information Only" are displayed together with check boxes, and one of the check boxes can be selected.

A picture input button 104*q* is positioned above the picture input field 104*e*. When the worker operates the picture input button 104*q*, a screen (not shown) for selecting picture data stored in the storage device 35 appears. When picture data is selected from the screen, the selected picture is displayed in the input field 104*e*.

A countermeasure input button 104*r* is positioned to the right of the countermeasure input field 104*f*. When the worker operates the countermeasure input button 104*r*, the countermeasure input screen 59 appears. When the worker operates the execution button 59*b* after entering a countermeasure in the countermeasure input field 59*a* in the countermeasure input screen 59, the countermeasure input screen 59 closes, and the countermeasure is entered into the countermeasure input field 104*f*. If, in this instance, "REPLACED" is entered into the countermeasure input field 104*f*, the keyboard dialog screen 47 appears. A number is then entered in the replacement part input field 104*g* when the keyboard dialog screen 47 is operated as described above.

A keyboard display button 104*s* is positioned to the right of the comment input field 104*h*. When the worker operates the keyboard display button 104*s*, the keyboard dialog screen 47 appears. Text data is then entered into the comment input field 104*h* when the keyboard dialog screen 47 is operated as described above.

When the worker operates the save button 104*i*, the data entered in the input fields 104*a*-104*h* is handled as new findings data and temporarily stored in the storage device 35 in association with the machine data and maintenance data (it should be noted that the temporarily stored new findings data cannot be output, for instance, to the management server 43). When the worker subsequently operates the recall button 104*j*, the temporarily stored new findings data is read and entered into the input fields 104*a*-104*h*. If the worker operates the clear button 104*k*, the input fields 104*a*-104*h* become blank. If the worker operates the submit button 104*l*, the data entered in the input fields 104*a*-104*h* is handled as new findings data and stored in the storage device 35 in association with the machine data and maintenance data (the stored new findings data can be output, for instance, to the management server 43).

When the worker operates the back button 103*a* in the new findings input screen 103, the displayed screen is returned to the previous screen. When the main menu button 103*b* in the new findings input screen 103, the displayed screen is returned to the maintenance input main menu screen 49.

Figure 10A:
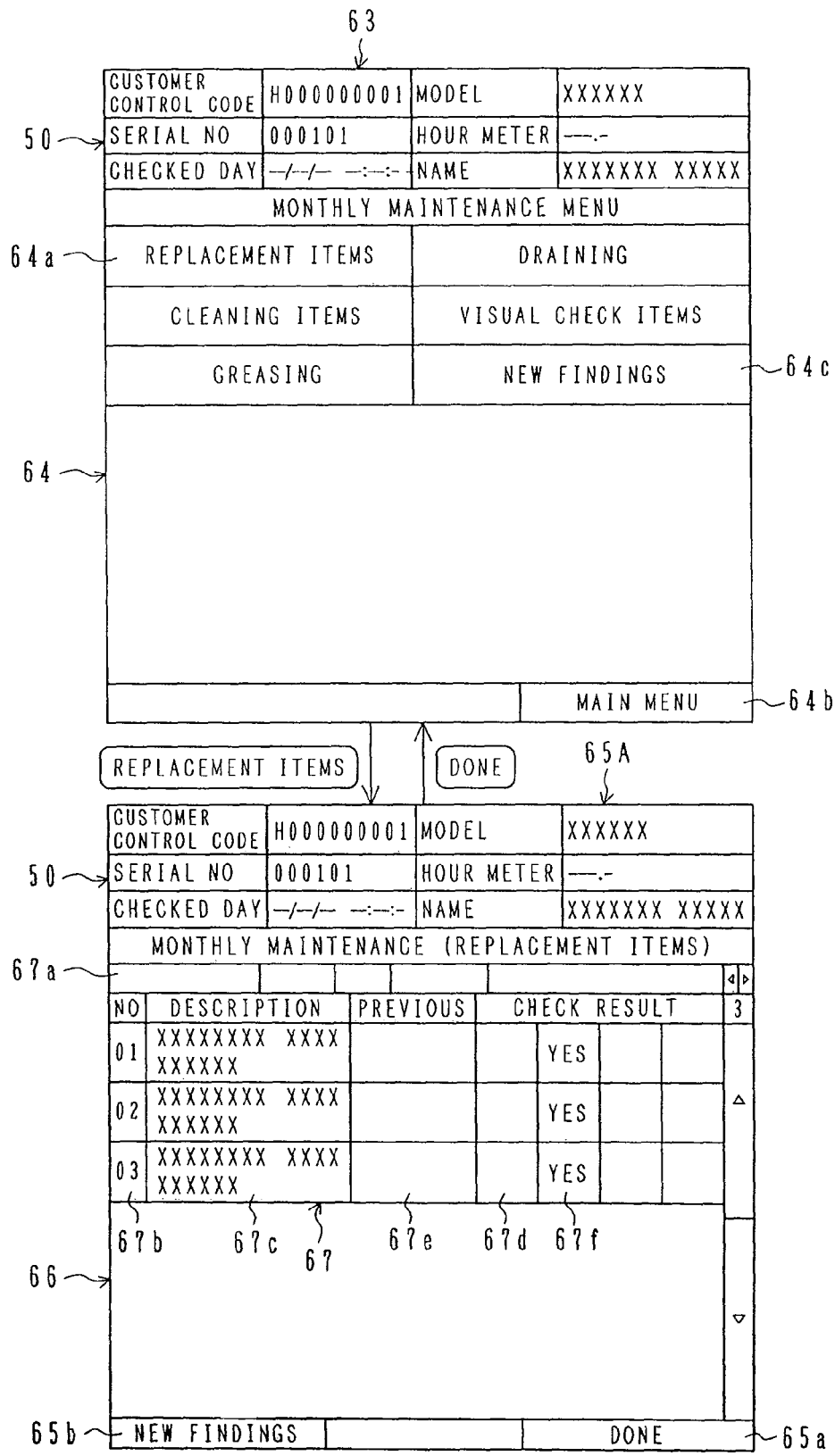
FIG. 10A shows the transition of a monthly maintenance input screen that is displayed on the monitor of the mobile terminal.
Figure 10B:
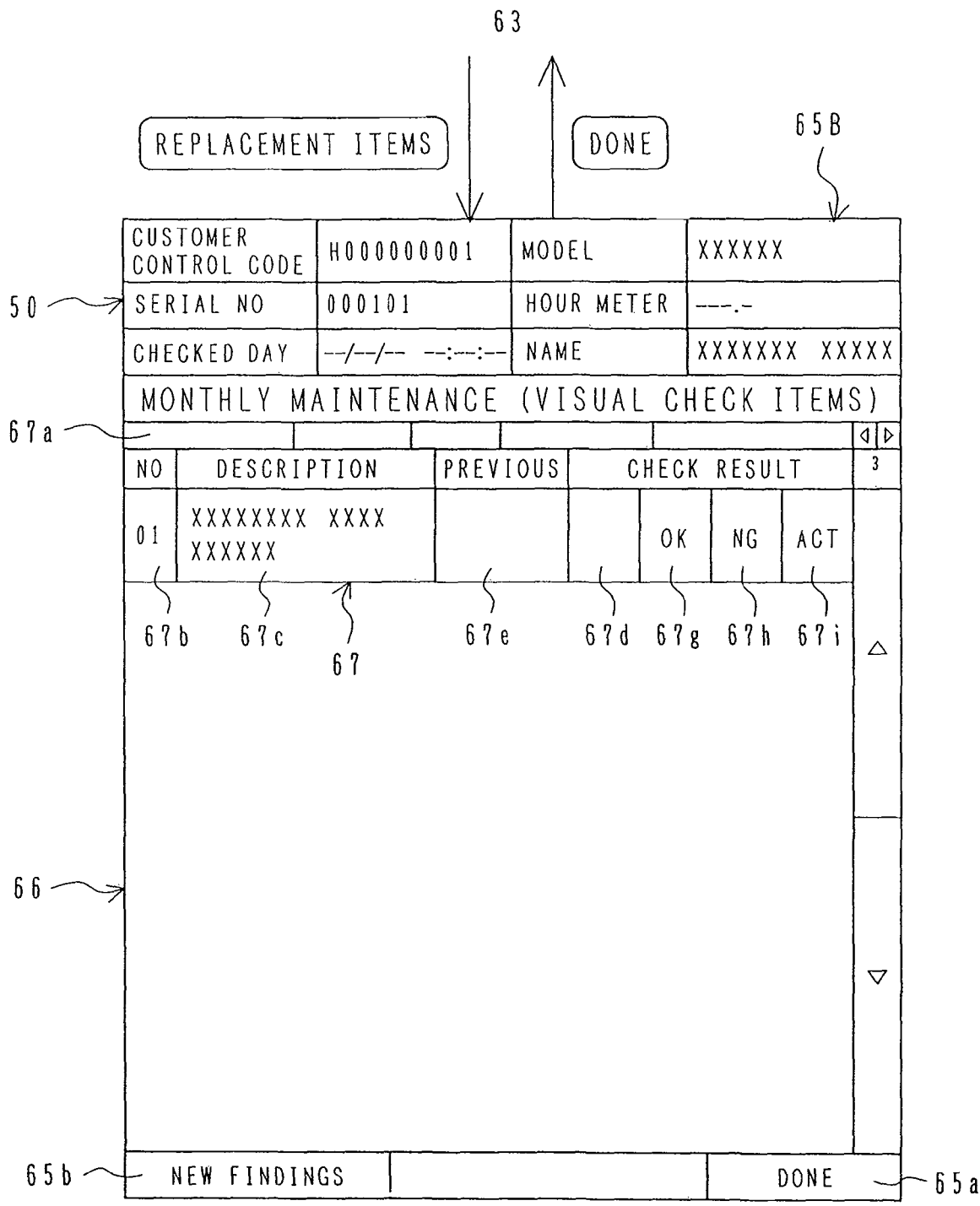
FIG. 10B shows a monthly maintenance input screen that is displayed on the monitor of the mobile terminal.

Returning to FIG. 5B, if the worker operates the monthly maintenance button 51*c* in the maintenance input main menu screen 49, the displayed screen is changed to the monthly maintenance input menu screen 63 shown in FIG. 10A. The monthly maintenance input menu screen 63 has the basic information display area 50 and a menu display area 64. The menu display area 64 has, for instance, five maintenance type buttons 64*a* (parts replacement button, oil draining button, cleaning button, visual inspection button, and greasing button in FIG. 10A), the aforementioned new findings button 64*c*, and a main menu button 64*b*. When the worker operates a maintenance type button 64*a*, the displayed screen is changed to the monthly maintenance input screen (the screens 65A and 65B are representatively shown in FIGS. 10A and 10B), which displays maintenance items that fall under the category indicated by the operated maintenance type button.

The monthly maintenance input screen (e.g., 65A or 65B) has the basic information display area 50, a maintenance input area 66, an execution button 65*a*, and the new findings button 65*b*. The maintenance input area 66 displays maintenance tasks that are to be performed monthly (e.g., at intervals of 250 operating hours or multiples of 250 operating hours). The maintenance input area 66 has a plurality of sheets 67 that displays a list of maintenance items classified by maintenance target (engines, engine oil, gear oil, drive system, hydraulic system, etc.). When the tab 67*a* of a sheet 67 indicating a maintenance target is operated, the corresponding sheet 67 is selected and displayed. The sheet 67 has an item number button 67*b*, an item description display field 67*c*, a data input field 67*d*, and a previous data display field 67*e* for each maintenance item. When the worker operates the item number button 67*b*, the associated maintenance target display screen (not shown) appears. This enables the worker to perform a maintenance task while confirming a maintenance target.

The worker can enter data into the data input field 67*d* while viewing the previous data display field 67*e*. A "YES" button 67*f* is provided for a maintenance item, for instance, in the monthly maintenance input screen 65A that appears when the parts replacement button 64*a* is operated, that is, a maintenance item which only maintenance execution data is input to. When the worker operates the "YES" button 67*f*, the word "YES" is entered into the data input field 67*d*. An "OK" button 67*g*, an "NG" button 67*h*, and an "ACT" button 67*i* are provided for a maintenance item, for instance, in the monthly maintenance input screen 65B that appears when the visual inspection button 64*a* is operated, that is, a maintenance item which a maintenance result or the like is input to. When the worker operates the "OK" button 67*g*, the word "OK" is entered into the data input field 67*d*. When the worker operates the "NG" button 67h, the word "NG" is entered into the data input field 67d. If the worker operates the "ACT" button 67i when any remedial action is taken after an unacceptable maintenance result is obtained, the countermeasure input screen 59 described above appears.

When the worker operates the execution button 59b after entering countermeasure data in the countermeasure input field 59a in the countermeasure input screen 59, a combination of the maintenance item and the data input in the countermeasure input field 59a is handled as countermeasure history data and stored in the storage device 35 in association with the machine data and maintenance data. Further, the countermeasure input screen 59 closes, and the word "ACT" is entered in the data input field 67d.

When the worker operates the execution button 65a in the monthly maintenance input screen (e.g., 65A or 65B), a combination of the maintenance item and the data entered in the data input field 67c is handled as monthly maintenance history data and stored in the storage device 35 in association with the machine data and maintenance data. Further, the displayed screen is returned to the monthly maintenance input menu screen 63. Furthermore, when the main menu button 64b in the monthly maintenance input menu screen 63 is operated, the displayed screen is returned to the maintenance input main menu screen 49.

Figure 12:
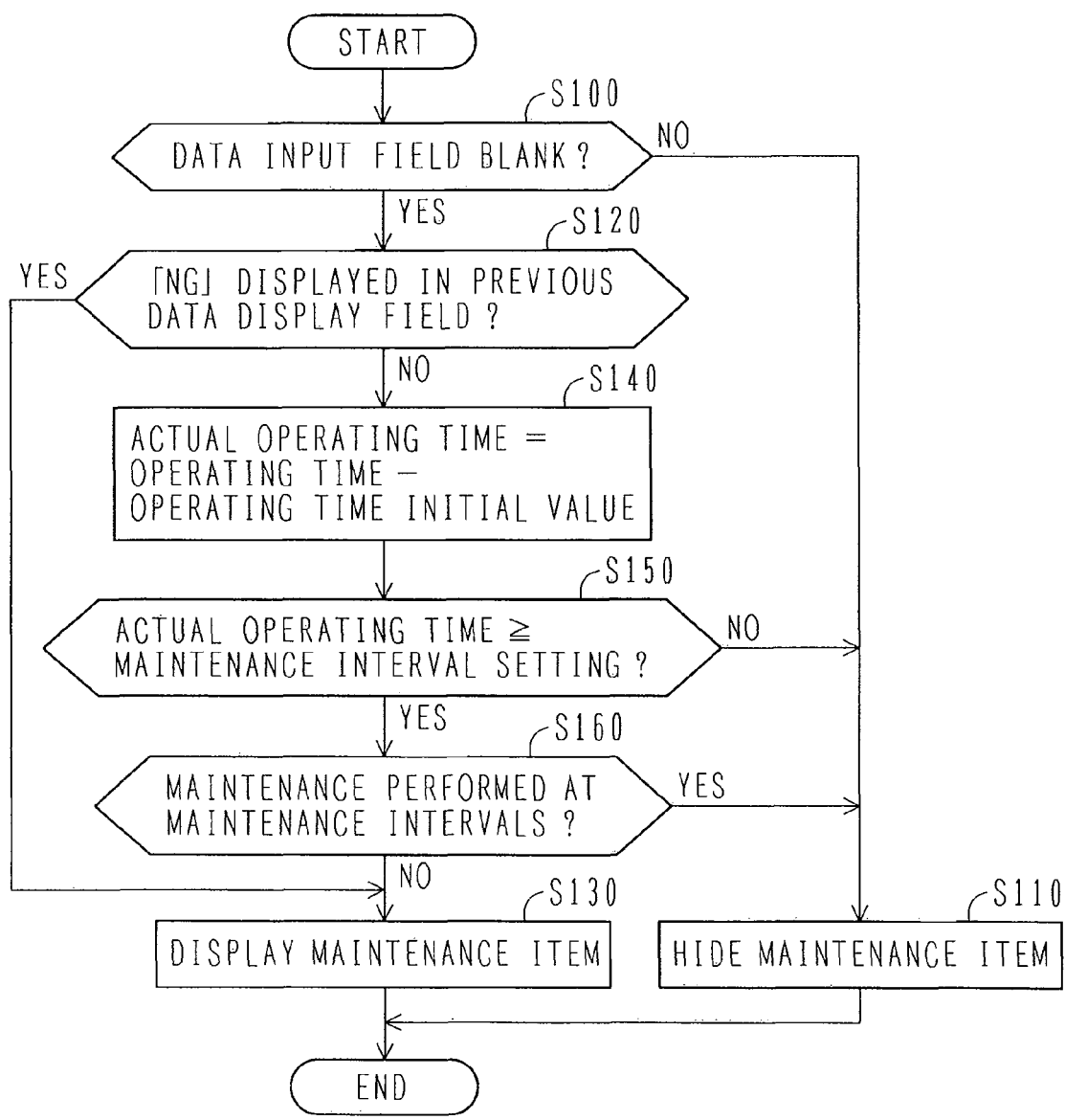
FIG. 12 is a flowchart showing control procedure of an extraction process that is performed on maintenance items to be displayed in the outstanding maintenance input screen.

Returning to FIG. 5B, if the worker operates the outstanding maintenance button 51d in the maintenance input main menu screen 49, the displayed screen is changed to the outstanding maintenance input screen 68 (see FIG. 11), which displays outstanding maintenance items extracted from maintenance items, for instance, in the daily maintenance input screen 54, weekly maintenance input screen 56, and monthly maintenance input screens 67A, 67B. FIG. 12 is a flowchart showing control procedure of an outstanding maintenance item extraction process.

Referring to FIG. 12, step 100 is performed first to determine whether the data input field 58d (or 67d) for each maintenance item is blank. If "YES", "OK", "NG", or "ACT" is input in the data input field 58d (or 67d), the determination of step 100 is not satisfied and processing proceeds to step 110. In step 110, the associated maintenance item is set in the un-indication state.

On the other hand, if the data input field 58d (or 67d) is blank in step 100, the determination is satisfied and processing proceeds to step 120. Step 120 is performed to determine whether "NG" is input in the previous data display field 58e (or 67e) for each maintenance item. If "NG" is input in the previous data display field 58e (or 67e), the determination of step 120 is satisfied and processing proceeds to step 130. In step 130, the associated maintenance item is set in the indication state. In other words, an outstanding maintenance item is extracted.

On the other hand, if the previous data display field 58e (or 67e) is "YES", "OK", "ACT", or blank in step 120, the determination is not satisfied and processing proceeds to step 140. In step 140, the actual operating time is calculated by determining the difference between the operating time prevailing at the beginning of communication and the operating time initial value prevailing at the time of delivery which are acquired from the data recording device 30. Next, step 150 is performed to read maintenance interval data (operating time standard, which will be described in detail later in conjunction with the maintenance interval setup program) from the storage device 35 in accordance with the model name of the hydraulic excavator 1 acquired from the data recording device 30, and to determine whether the actual operating time is not shorter than the maintenance interval. If the actual operating time is shorter than the maintenance interval, the determination of step 150 is not satisfied and processing proceeds to step 110. The associated maintenance item is set in the un-indication state in step 110.

On the other hand, if the actual operating time is not shorter than the maintenance interval in step 150, the determination is satisfied and processing proceeds to step 160. Step 160 is performed to determine whether maintenance has been performed at the maintenance interval (actually within a predefined permissible maintenance period that is based on specified maintenance interval) in accordance with the previous maintenance history data stored in the storage device 38. If maintenance has been performed at the maintenance interval, the determination of step 160 is satisfied and processing proceeds to step 110. The associated maintenance item is set in the un-indication state in step 110. On the other hand, if maintenance has not been performed at the maintenance interval, the determination of step 160 is not satisfied and processing proceeds to step 130. The associated maintenance item is set in the indication state in step 130. In other words, an outstanding maintenance item is extracted.

The outstanding maintenance item extraction process described above may be performed when the worker operates the execution button 48g in the maintenance information input screen 48. Further, if there is any outstanding maintenance item, the displayed screen may be changed to the outstanding maintenance input screen 68, and if there is no outstanding maintenance item, the displayed screen may be changed to the maintenance input main menu screen 49. Furthermore, it is preferable that outstanding maintenance items be extracted just before a point of maintenance recommendation time. Therefore, step 150 may be performed to judge whether the actual operating time is not shorter than the maintenance interval minus a predetermined period.

Returning to FIG. 11, the outstanding maintenance input screen 68 has the basic information display area 50, a maintenance input area 69, an execution button 68a, and the new findings button 68b. The maintenance input area 69 displays outstanding maintenance items extracted as described above. The maintenance input area 69 has a plurality of sheets 70 that displays a list of maintenance items classified by maintenance type (parts replacement, oil draining, cleaning, appearance inspection, greasing, level inspection, visual inspection, etc.). When the tab 70a of a sheet 70 indicating a maintenance type is operated, the corresponding sheet 70 is selected and displayed. The configuration of the sheet 70 is not described here because it is the same as for the aforementioned sheets 58, 67.

When the execution button 68a in the outstanding maintenance input screen 68 is operated, the associated maintenance history data (daily maintenance history data, weekly maintenance history data, and monthly maintenance history data) is stored in the storage device 35 in association with the machine data and maintenance data. Further, the displayed screen is returned to the maintenance input main menu screen 49.

Returning to FIG. 5B, if the worker operates the replenishment button 51e in the maintenance input main menu screen 49, the displayed screen is changed to a replenishment amount input screen 71 shown in FIG. 13. The replenishment amount input screen 71 is used to enter a replenishment amount for a replenishment operation in the case that there is a person who periodically effects replenishment in addition to a person who performs maintenance (replenishment and replacement tasks included).

The replenishment amount input screen 71 has a basic information display area 50A (this area is obtained by removing the maintenance date/time display field 50e from the basic information display area 50), a date input field 71a for entering a replenishment date, a time input field 71b for entering replenishment time, a replenishment item input field 71c, a replenishment amount input field 71d, an amount unit display field 71e, and an execution button 71f. The amount unit display field 71e displays a unit that is selected by the option setup program as described later.

numeric keypad display buttons 71g for enabling to open the numeric keypad dialog screen 62 are positioned to the right of the date input field 71a, time input field 71b, and replenishment amount input field 71d. A replenishment date, time, and amount is input into the date input field 71a, time input field 71b, and replenishment amount input field 71d when the numeric keypad dialog screen 62 is operated as described above. A list display button 71h is positioned to the right of the replenishment item input field 71c. When the worker operates the list display button 71h, an input list (not shown) appears to list, for instance, "ENGINE OIL", "GEAR OIL", and so on. When the worker selects, for instance, "ENGINE OIL" from the input list, the input list closes, and "ENGINE OIL" is entered in the replenishment item input field 46e.

When the execution button 71f in the replenishment amount input screen 71 is operated, the replenishment date and time (local time) entered in the date input field 71a and time input field 71b is converted to international standard time. Further, the converted date and time (international standard time), the operating time indicated in the operating time display field 50d of the basic information display area 50A, and the maintenance personnel name indicated in the name display field 50f are stored in the storage device 35 as replenishment data. In addition, a combination of the replenishment item entered in the replenishment item input field 71c, the amount entered in the replenishment amount input field 71d, and the unit indicated in the amount unit display field 71e is handled as replenishment history data and stored in the storage device 35 in association with the machine data and replenishment data. Furthermore, the displayed screen is returned to the maintenance input main menu screen 49.

Returning to FIG. 5B, if the worker operates the requested action button 51g in the maintenance input main menu screen 49, the displayed screen is changed to a requested action input screen 105 (see FIG. 25) that displays additionally set maintenance items. The requested action input screen 105 has the basic information display area 50, a maintenance input area 106, and an execution button 105a. The maintenance input area 106 has an item number button 106a, an item description display field 106b, a replacement parts display field 106c, and a data input field 106d for each maintenance item. When the worker operates the item number button 106a, the associated maintenance target display screen (not shown) appears. This enables the worker to perform a maintenance task while confirming a maintenance target. If a parts replacement task is indicated in the item description display field 106b, the associated replacement part number is indicated in the replacement parts display field 106c.

An "OK" button 106e, an "NG" button 106f, and an "ACT" button 106g are provided for a maintenance item which a maintenance result or other similar data is input to. When the worker operates the "OK" button 106e, the word "OK" is entered into the data input field 106d to indicate that an acceptable maintenance result is obtained. When the worker operates the "NG" button 106f, the word "NG" is entered into the data input field 106d to indicate that an unacceptable maintenance result is obtained (a problem is encountered and not corrected). If the worker operates the "ACT" button 106g when any remedial action is taken after an unacceptable maintenance result is obtained, the countermeasure input screen 59 described above appears.

When the worker operates the execution button 59b after entering countermeasure data in the countermeasure input field 59a of the countermeasure input screen 59, a combination of the maintenance item and the data entered in the countermeasure input field 59a is handled as countermeasure history data and stored in the storage device 35 in association with the machine data and maintenance data. Further, the countermeasure input screen 59 closes, and the word "ACT" is entered into the data input field 106d.

When the worker operates the execution button 105a in the requested action input screen 105, a combination of the maintenance item and the data entered in the data input field 106d is handled as requested action history data and stored in the storage device 35 in association with the machine data and maintenance data. Further, the displayed screen is returned to the maintenance input main menu screen 49.

Returning to FIG. 5B, if the worker operates the machine information button 51a in the maintenance input main menu screen 49, the displayed screen is changed to a machine information display screen 72 shown in FIG. 14. The machine information display screen 72 has the basic information display area 50, a front operating mechanism type display field 72a, engine identification number display fields 72b, 72c, a delivery date display field 72d, and an execution button 72e. The front operating mechanism type display field 72a, engine identification number display fields 72b, 72c, and delivery date display field 72d display some of the machine data stored in the storage device 35 (the type of the front operating mechanism 5, the identification numbers of the engines 19, and the delivery date). When the worker operates the execution button 72e in the machine information display screen 72, the displayed screen is changed to the maintenance input main menu screen 49. Operating the exit button 51f in the maintenance input main menu screen 49 terminates a maintenance program.

(2) Maintenance History Display

FIG. 15 shows a main screen that is displayed on the monitor 38 when the maintenance history display program is started.

When the maintenance history display program starts, a maintenance history display main menu screen 73 is displayed as shown in FIG. 15. The maintenance history display main menu screen 73 has a customer code input field 73a, a daily/weekly maintenance button 73b, a monthly maintenance button 73c, a replenishment button 73d, and an exit button 73e.

A list display button 73f is positioned to the right of the customer code input field 73a. When the worker or administrator (the term "administrator" will be hereinafter abbreviated) operates the list display button 73f, an input list (not shown) appears to list customer codes that are contained in the machine data stored in the storage device 35. When the worker selects a customer code from the input list, the input list closes, and the selected customer code is entered into the customer code input field 73a. When the worker operates the daily/weekly maintenance button 73b in the maintenance history display main menu screen 73, the displayed screen is changed to a daily/weekly maintenance history display menu screen 74 shown in FIG. 16A.

The daily/weekly maintenance history display menu screen 74 has a customer code display field 74a, a model name input field 74b for entering the model name of the hydraulic excavator 1, a serial number input field 74c for entering the serial number of the hydraulic excavator 1, a maintenance date/time range display field 74d for maintenance results indication, and a menu display area 75. The customer code display field 74a displays a customer code entered in the customer code input field 73a of the maintenance history display main menu screen 73.

List display buttons 74e, 74f are positioned to the right of the model name input field 74b and serial number input field 74c. When the worker operates the list display button 74e, an input list appears to list model names that are stored in the storage device 35 and associated with the customer code displayed in the customer code display field 74a. When the worker selects a model name from the input list, the input list closes, and the selected model name is entered into the model name input field 74b. When the worker operates the list display button 74f subsequently, an input list appears to list serial numbers that are stored in the storage device 35 and associated with the customer code displayed in the customer code display field 74a and the model name entered in the model name input field 74b. When the worker selects a serial number from the input list, the input list closes, and the selected serial number is entered into the serial number input field 74b. The maintenance data, that is associated with machine data containing the customer code displayed in the customer code display field 74a and the model name and serial number entered in the model name input field 74b and serial number input field 74c, is then read from the storage device 35, and the range of the date/time (converted to the local time) contained in the maintenance data is displayed in the maintenance date/time range display field 74d.

The menu display area 75 has a daily maintenance button 75a, a weekly maintenance button 75b, a replenishment/replacement amount button 75c, and a main menu button 75d. When the worker operates the daily maintenance button 75a in the daily/weekly maintenance history display menu screen 74, the daily maintenance history data associated with the aforementioned machine data and maintenance data is extracted and read from the storage device 35. Further, the displayed screen is changed to a daily maintenance history display screen 76.

The daily maintenance history display screen 76 has a basic information display area 77, a maintenance history display area 78, and a submenu button 76a. The basic information display area 77 has a customer code display field 77a, a model name display field 77b, a serial number display field 77c, and a maintenance date/time range display field 77d, and displays some of the machine data (customer code, and model name and serial number of hydraulic excavator 1) and the date/time range included in the maintenance data.

The maintenance history display area 78 has a plurality of sheets 79 that displays a list of maintenance items classified by maintenance type (cleaning, oil draining, greasing, level inspection, visual inspection, etc.). When the tab 79a of a sheet 79 indicating a maintenance type is operated, the corresponding sheet 79 is selected and displayed. The sheet 79 has a date display field 79b for displaying a maintenance date, a time display field 79c for displaying maintenance time, an operating time display field 79d, an item description display field 79e for describing each maintenance item, and a data display field 79f. The date display field 79b and time display field 79c display maintenance date/time (international standard time), which is part of the maintenance data read from the storage device 35 and converted to the local time. The operating time display field 79d displays operating time, which is part of the maintenance data read from the storage device 35. The data display field 79f for each maintenance item displays daily maintenance history data read from the storage device 35. The date display field 79b, time display field 79c, operating time display field 79d, and data display field 79f that are related to each other are positioned in the same column. If there is a plurality of related data, a plurality of columns is arranged. When the worker operates the submenu button 76a in the daily maintenance history display screen 76, the displayed screen is returned to the daily/weekly maintenance history display menu screen 74.

Figure 16B:
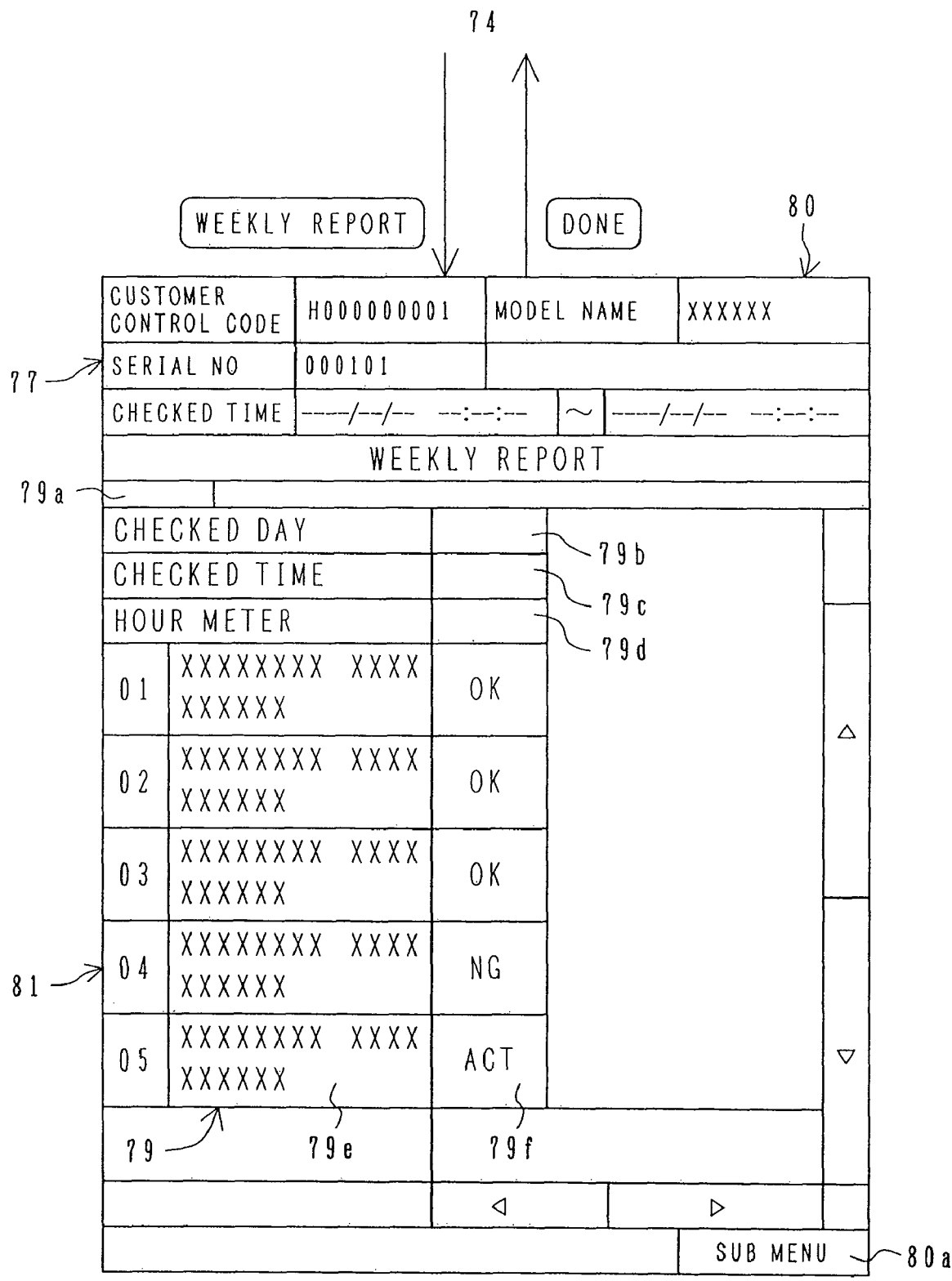
FIG. 16B shows a weekly maintenance history screen that is displayed on the monitor of the mobile terminal.

When the worker operates the weekly maintenance button 75b in the daily/weekly maintenance history display menu screen 74, the weekly maintenance history data associated with the aforementioned machine data and maintenance data is extracted and read from the storage device 35, and the displayed screen is to a weekly maintenance history display screen 80 (see FIG. 16B).

The weekly maintenance history display screen 80 has the basic information display area 77, a maintenance history display area 81, and a submenu button 80a. The maintenance history display area 81 has a plurality of sheets 79 that displays a list of maintenance items classified by maintenance type. When the tab 79a of a sheet 79 indicating a maintenance type is operated, the corresponding sheet 79 is selected and displayed. The data display field 79f for each maintenance item on the selected sheet 79 displays weekly maintenance history data read from the storage device 35. When the worker operates the submenu button 80a in the weekly maintenance history display screen 80, the displayed screen is returned to the daily/weekly maintenance history display menu screen 74.

Figure 16C:
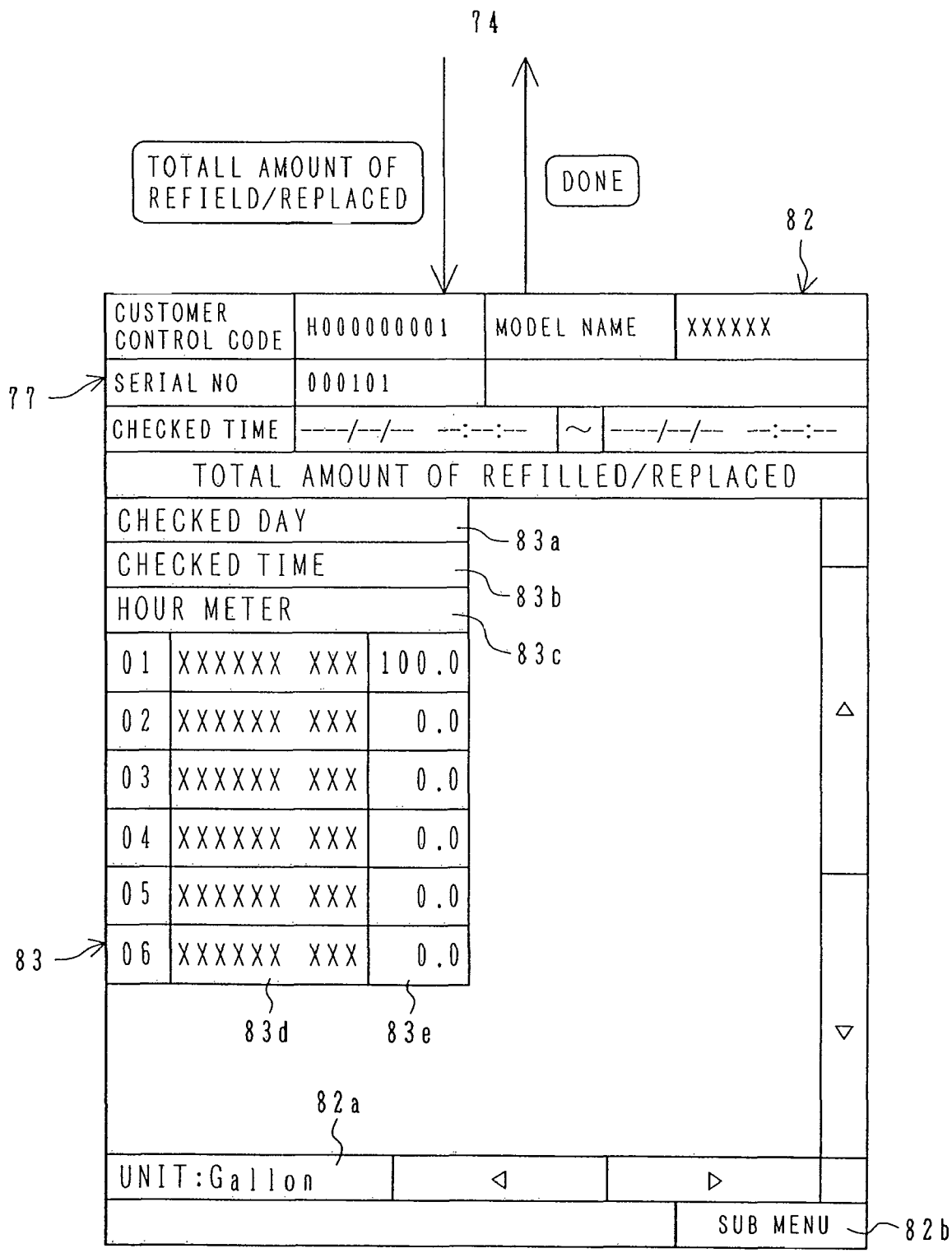
FIG. 16C shows a replenishment/replacement amount screen that is displayed on the monitor of the mobile terminal.

When the worker operates the replenishment/replacement amount button 75c in the daily/weekly maintenance history display menu screen 74, the replenishment/replacement history data associated with the aforementioned machine data and maintenance data is extracted and read from the storage device 35, and the displayed screen is changed to a replenishment/replacement amount display screen 82 (see FIG. 16C).

The replenishment/replacement amount display screen 82 has the basic information display area 77, a replenishment/replacement amount display area 83, an amount unit display field 82a, and a submenu button 82b. The replenishment/replacement amount display area 83 has a date display field 83a for indicating a maintenance execution date, a time display field 83b for indicating maintenance time, an operating time display field 83c, and a name display field 83d for each oil item (e.g., engine oil, gear oil, hydraulic oil, water, grease, or fuel), and data display field 83e. The date display field 83a and time display field 83b display maintenance date/time (international standard time), which is part of the maintenance data read from the storage device 35 and converted to the local time. The operating time display field 83c displays operating time, which is part of the maintenance data read from the storage device 35. The data display field 83e for each maintenance item and the amount unit display field 82a display replenishment/replacement history data read from the storage device 35. The date display field 83a, time display field 83b, operating time display field 83c, and data display field 83e that are related to each other are positioned in the same column. If there is a plurality of related data, a plurality of columns is arranged.

When the worker operates the submenu button 82b in the replenishment/replacement amount display screen 82, the displayed screen is returned to the daily/weekly maintenance history display menu screen 74. Further, when the main menu button 75d in the daily/weekly maintenance history display menu screen 74 is operated, the displayed screen is returned to the maintenance history display main menu screen 73.

Returning to FIG. 15, if the worker operates the monthly maintenance button 73c in the maintenance history display main menu screen 73, the displayed screen is changed to a monthly maintenance history display menu screen 84 shown in FIG. 17. The monthly maintenance history display menu screen 84 has the basic information display area 77 and a menu display area 85. The menu display area 85 has a plurality of maintenance type buttons 85a (parts replacement button, oil draining button, cleaning button, visual inspection button, and greasing button in FIG. 17) and a main menu button 85b. When the worker operates one of the plurality of maintenance type buttons 85a, the displayed screen is changed to the monthly maintenance input screen (the screen 86A is representatively shown in FIG. 17), which displays maintenance items that fall under the category indicated by the operated maintenance type button.

The monthly maintenance display screen (e.g., 86A) has the basic information display area 77, a maintenance history display area 87, and a submenu button 86a. The maintenance history display area 87 has a plurality of sheets 88 that displays a list of maintenance items classified by maintenance target (e.g., engine system, engine oil, gear oil, drive system, or hydraulic system). When the tab 88a of a sheet 88 indicating a maintenance target is operated, the corresponding sheet 88 is selected and displayed. The sheet 88 has a date display field 88b for displaying a maintenance date, a time display field 88c for displaying maintenance time, an operating time display field 88d, an item description display field 88e for describing each maintenance item, and a data display field 88f. The date display field 88b and time display field 88c display maintenance date/time (international standard time), which is part of the maintenance data read from the storage device 35 and converted to the local time. The operating time display field 88d displays operating time, which is part of the maintenance data read from the storage device 35. The data display field 88f for each maintenance item displays monthly maintenance history data read from the storage device 35. The date display field 88b, time display field 88c, operating time display field 88d, and data display field 88f that are related to each other are positioned in the same column. If there is a plurality of related data, a plurality of columns is arranged.

When the worker operates the submenu button 86a in the monthly maintenance history display screen (e.g., 86A), the displayed screen is returned to the monthly maintenance history display menu screen 84. Further, when the main menu button 85b in the monthly maintenance history display menu screen 84 is operated, the displayed screen is returned to the maintenance history display main menu screen 73.

Returning to FIG. 15, if the worker operates the replenishment button 73d in the maintenance history display main menu screen 73, the displayed screen is changed to a replenishment amount input screen 89 shown in FIG. 18. The replenishment amount input screen 89 is used to enter a replenishment amount for a replenishment operation, in the case that there is a person who periodically effects replenishment in addition to a person who performs maintenance (replenishment and replacement tasks included).

The replenishment amount input screen 89 has a basic information display area 77A (this area is obtained by removing the maintenance date/time range display field 77d from the basic information display area 77), a date input field 89a for entering a replenishment date, a time input field 89b for entering replenishment time, an operating time input field 89c for entering the operating time of the hydraulic excavator 1, a name input field 89d for entering the name of the replenishment personnel, a replenishment item input field 89e, a replenishment amount input field 89f, an amount unit display field 89g, and a submenu button 89h. The amount unit display field 89g displays a unit that is selected by the option setup program as described later.

numeric keypad display buttons 89i for enabling to open the numeric keypad dialog screen 62 are positioned to the right of the date input field 89a, time input field 89b, operating time input field 89c, and replenishment amount input field 89f. A replenishment date, replenishment time, operating time, and replenishment amount is entered into the date input field 89a, time input field 89b, operating time input field 89c, and replenishment amount input field 89f when the numeric keypad dialog screen 62 is operated as described above.

A keyboard display button 89j and a list display button 89k are positioned to the right of the name input field 89d. When the worker operates the keyboard display button 89j, the keyboard dialog screen 47 appears. A name is then entered into the name input field 89d when the keyboard dialog screen 47 is operated as described above. On the other hand, when the worker operates the list display button 89k, an input list (not shown) appears to list a plurality of names (e.g., preselected or previously stored names). When the worker selects a name from the input list, the input list closes, and the selected name is entered into the name input field 89d.

A list display button 89l is positioned to the right of the replenishment item input field 89e. When the worker operates the list display button 89l, an input list (not shown) appears to list, for instance, "ENGINE OIL", "GEAR OIL", and so on. When the worker selects, for instance, "ENGINE OIL" from the input list, the input list closes, and "ENGINE OIL" is entered into the replenishment item input field 89e.

When the worker operates the submenu button 89h in the replenishment amount input screen 89, the replenishment date/time (local time) entered in the date input field 89a and time input field 89b is converted to the international standard time. Further, the converted date/time (international standard time), the operating time entered in the operating time input field 89c, and the replenishment personnel name entered in the name input field 89d are stored in the storage device 35 as replenishment data. Furthermore, a combination of the replenishment item entered in the replenishment item input field 89e and the replenishment amount entered in the replenishment amount input field 89f (plus the unit displayed in the amount unit display field 89g) is handled as replenishment history data and stored in the storage device 35 in association with the machine data and replenishment data. Moreover, the displayed screen is returned to the maintenance history display main menu screen 73. Operating the exit button 73e in the maintenance history display main menu screen 73 terminates the maintenance history display program.

(3) Maintenance Interval Setup

Figure 19:
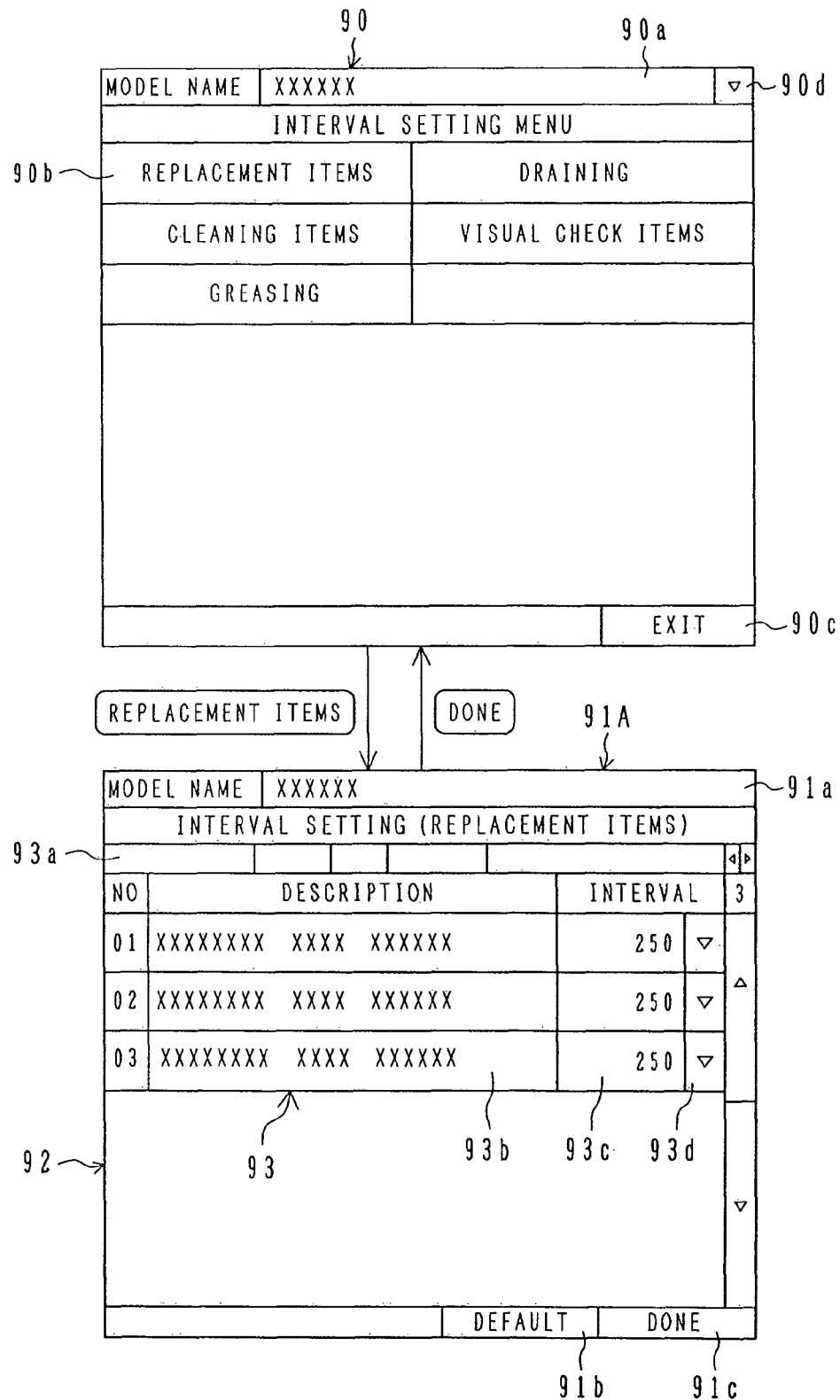
FIG. 19 shows the transition of a screen that is displayed on the monitor when a maintenance interval setup program is started in the mobile terminal.

FIG. 19 shows the transition of a screen that is displayed on the monitor 38 when the maintenance interval setup program is started. The present embodiment can change the maintenance intervals variously for all monthly maintenance items.

When the maintenance interval setup program starts, an interval setup menu screen 90 is displayed as shown FIG. 19. The interval setup menu screen 90 has a model name input field 90a for entering the model name of the hydraulic excavator 1, a plurality of maintenance type buttons 90b (parts replacement button, oil draining button, cleaning button, visual inspection button, and greasing button in FIG. 19), and an exit button 90c. A list display button 90d is positioned to the right of the model name input field 90a. When the administrator operates the list display button 90d, an input list (not shown) appears to list various hydraulic excavator model names (prestored model names or model names input and stored from the data recording device 30). When the administrator selects a model name from the input list, the input list closes, and the selected model name is entered in the model name input field 90*a*.

When the administrator operates one of the plurality of maintenance type buttons 90*b*, the displayed screen is changed to an interval setting input screen (the screen 91A is representatively shown in FIG. 19), which displays maintenance items that fall under the category indicated by the operated maintenance type button.

The interval setting input screen (e.g., 91A) has a model name display field 91*a*, an interval setting input area 92, a default button 91*b*, and an execution button 91*c*. The model name display field 91*a* displays a model name entered in the model name input field 90*a* of the interval setup menu screen 90. The interval setting input area 92 has a plurality of sheets 93 that display a list of maintenance items classified by maintenance target (e.g., engine system, engine oil, gear oil, drive system, or hydraulic system). When the tab 93*a* of a sheet 93 indicating a maintenance target is operated, the corresponding sheet 93 is selected and displayed. The sheet 93 has an item description display field 93*b* and an interval input field 93*c* for each maintenance item. A list display button 93*d* is positioned to the right of the interval input field 93*c*. When the administrator operates the list display button 93*d*, an input list (not shown) appears to list, for instance, a plurality of minimum interval units (basic units). When the administrator selects a minimum interval unit from the input list, the input list closes, and the selected minimum interval unit is entered into the interval input field 93*c*. If the administrator operates the default button 91*c*, all the interval input fields 93*c* of a displayed sheet 93 revert to an initial value (e.g., "250").

When the administrator operates the execution button 91*c* in the interval setting input screen (e.g., 91A), a combination of the maintenance item and the minimum interval unit entered in the interval input field 93*b* is handled as basic interval data for the model indicated in the model name display field 91*a* and stored in the storage device 35. Further, the displayed screen is returned to the interval setup menu screen 90.

The CPU 36 in the mobile terminal 34 computes the maintenance interval for each maintenance item in accordance with the basic interval data stored in the storage device 35, and stores the computed maintenance intervals in the storage device 35 as maintenance interval setting data. More specifically, recommended maintenance interval data for various hydraulic excavator models (e.g., manufacturer-recommended maintenance intervals for each maintenance item) are prestored in the storage device 35, and a multiple of the minimum interval unit for each maintenance item that is closest to a recommended interval value is selected as an interval setting. If, for instance, the minimum interval unit is 300 hours in a situation where the recommended interval value is 4000 hours, 3900 hours and 4200 hours, which are multiples of 300 hours, are compared. Since 3900 hours is closer to the recommended interval value (4000 hours) than 4200 hours, an interval setting of 3900 hours is selected. The aforementioned process for extracting outstanding maintenance items is performed in accordance with the maintenance interval setting data described above.

An alternative would be to display the aforementioned interval setting for each maintenance item and allow the administrator to change the interval setting without exceeding the recommended interval value although such an alternative is not indicated in the drawings or the like.

(4) Option Setup

Figure 20:
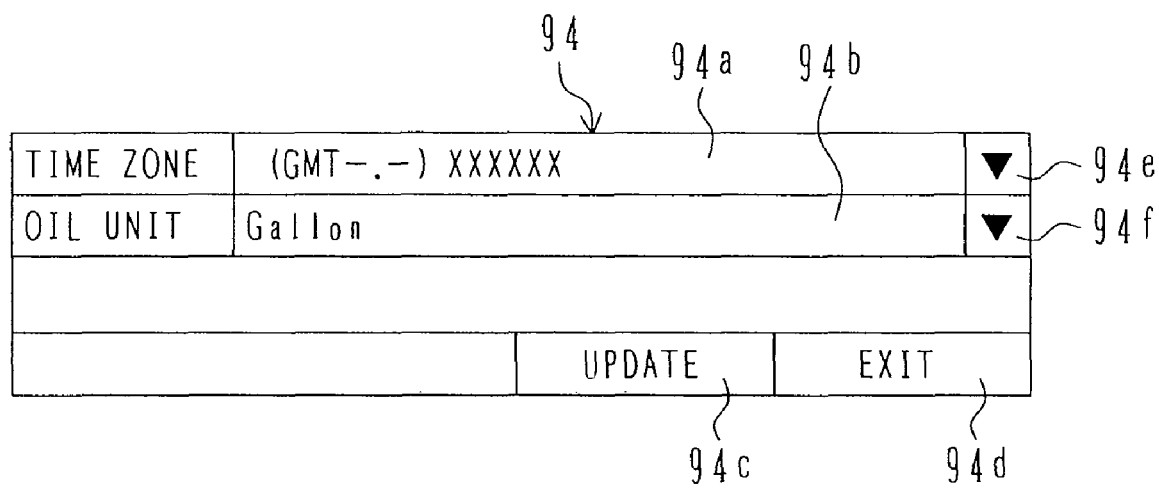
FIG. 20 shows a screen that is displayed on the monitor when an option setup program is started in the mobile terminal.

FIG. 20 shows a screen that is displayed on the monitor 38 when the option setup program is started.

When the option setup program starts, an option setup screen 94 is displayed as shown in FIG. 20. The option setup screen 94 has a country/region input field 94*a*, an amount unit input field 94*b*, an update button 94*c*, and an exit button 94*d*. List display buttons 94*e*, 94*f* are positioned to the right of the country/region input field 94*a* and amount unit input field 94*b*. When the administrator operates the list display button 94*e*, an input list (not shown) appears to list a plurality of countries/regions (and the time differences from the international standard time). When the administrator selects a country/region from the input list, the input list closes, and the selected country/region is entered into the country/region input field 94*a*. On the other hand, when the administrator operates the list display button 94*f*, an input list (not shown) appears to list, for instance, "gallon", "Liter", and so on. When the administrator selects, for instance, "gallon" from the input list, the input list closes, and "gallon" is entered into the amount unit input field 94*b*.

When the administrator operates the update button 94*c* in the option setup screen 94, the data entered in the country/region input field 94*a* and amount unit input field 94*b* are stored in the storage device 35 as option setting data, and the option setup program terminates. If the administrator operates the exit button 94*d* in the option setup screen 94, the option setup program terminates immediately.

In accordance with the time difference from the international standard time included in the option setting data, the date/time (international standard time) acquired from the data recording device 30 (or stored in the storage device 35) and the date/time (local time) to be displayed on screen are converted as described above. Further, the unit included in the option setting data is displayed in the aforementioned amount unit display fields 60*a*, 71*e*, 89*g*.

The operations and advantages of the present embodiment will now be described.

When, for instance, the engine system 19 is to be inspected for monthly maintenance purposes, the worker moves into the engine chamber in the housing 6A (or 6B) of the hydraulic excavator 1, and connects the mobile terminal 34 to the communication connector 32B through the communication cable 33B, and operates the mobile terminal 34 to enter the operating time and date/time from the data control device 30 to the mobile terminal 34. Further, the worker operates the mobile terminal 34 to display engine system maintenance items on the monitor 38, and performs maintenance as specified, and operates the mobile terminal 34 to enter maintenance result data for the purpose of indicating whether acceptable maintenance results are obtained. The mobile terminal 34 handles the input data for maintenance items as maintenance history data and stores it in association with the operating time and date/time of the hydraulic excavator 1. The worker causes the monitor 38 to display the maintenance history data stored in the mobile terminal 34.

Figure 21:
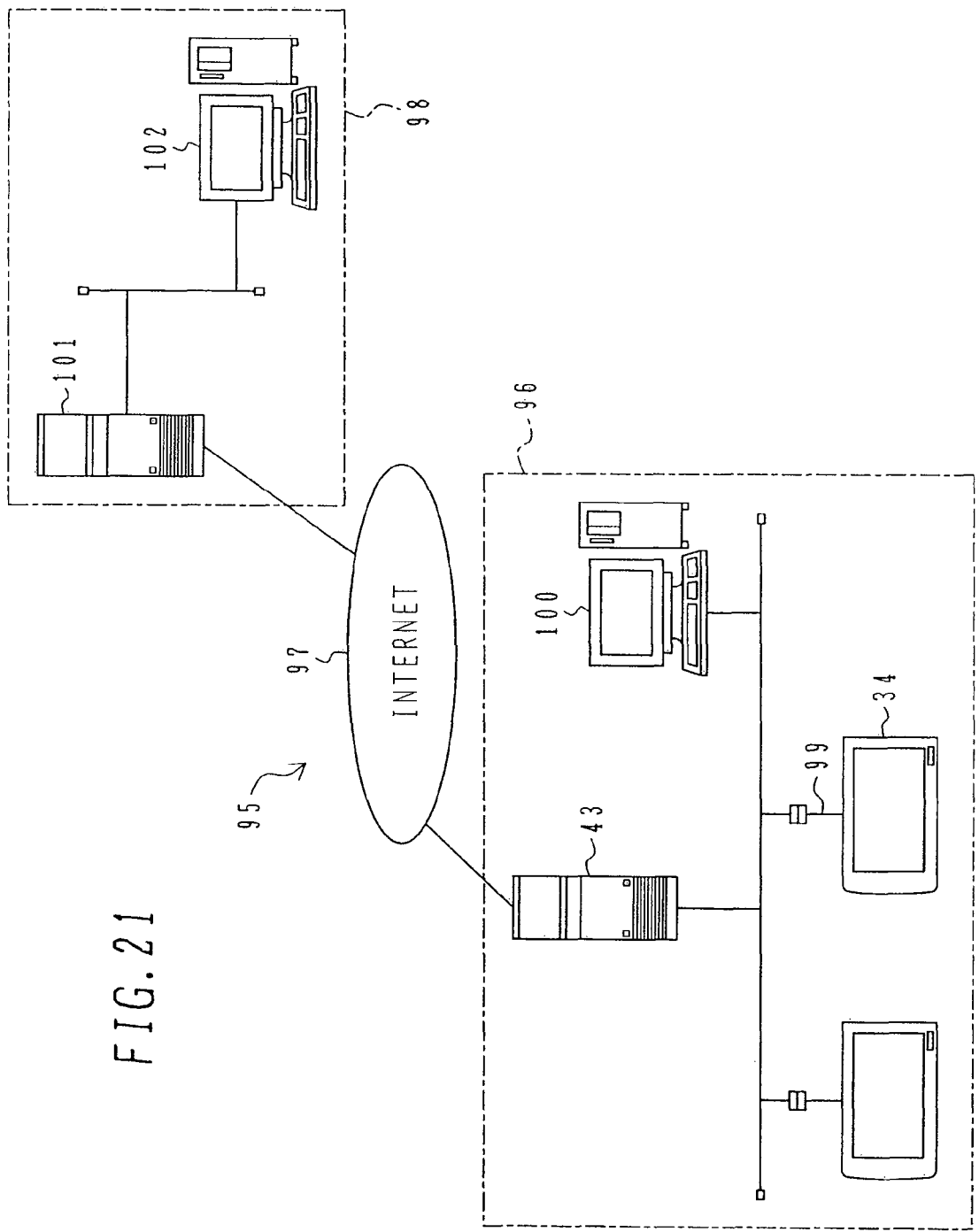
FIG. 21 is a schematic diagram exemplifying the configuration of an information network that is a part of the construction machine maintenance history information management system according to one embodiment of the present invention.

The worker may output the maintenance history data stored in the mobile terminal 34, for instance, to the management server 43. FIG. 21 is a schematic diagram exemplifying the configuration of an information network including the management server 43.

As shown in FIG. 21, the information network 95 comprises a customer network 96 and a manufacturer network 98. The customer network 96 is positioned, for instance, in an office near the work site for the hydraulic excavator 1. The manufacturer network 98 is connected to the customer network 96 via a communication link 97 (e.g., the Internet based on a public circuit). The customer network 96 comprises the management server 43 and an information terminal 100. The management server 43 inputs the maintenance history data from the mobile terminal 34, which is communication-connected through the communication cable 99 or the like (or via a wireless communication link), and stores the input maintenance history data. The information terminal 100 is connected to the management server 43. The manufacturer network 98 comprises a management server 101 and an information terminal 102. The management server 101 checks whether the maintenance history data in the management server 43 of the customer network 96 is updated. If the maintenance history data is updated, the management server 101 performs a download automatically or with a customer's approval. The aforementioned maintenance history display program is installed on the information terminals 100, 102. In the information terminals 100, 102, the maintenance history data stored in the management servers 43, 101 is displayed on the monitor in accordance with the operation.

As described above, the present embodiment enables the mobile terminal 34 to acquire the operating time and date/time from the data recording device 30 of the hydraulic excavator 1 and store the acquired temporal information about the hydraulic excavator 1 in association with the maintenance history data. Consequently, the reliability of the temporal information about the maintenance history data can be made higher than when, for instance, the temporal information is manually entered into the mobile terminal 34. Further, since the temporal information about the hydraulic excavator 1 is used as the reference, the temporal relationship between the maintenance history data and the occurrence of a hydraulic excavator abnormality can be determined with increased precision. This makes it possible to perform fault diagnostics on the hydraulic excavator 1 more rapidly with increased accuracy.

Further, the present embodiment makes it possible to carry the mobile terminal 34 in accordance with a maintenance target of the hydraulic excavator, and to connect the mobile terminal 34 to the communication connector 32B or 32C via the communication cable 33B (or connect the mobile terminal 34 to the communication connector 32A via the communication cable 33A), and to enter the operating time, date/time, and other data from the data recording device 30 into the mobile terminal 34. Therefore, the data can be entered into the mobile terminal 34 near a maintenance target that is accessed for maintenance purposes. This makes it possible to increase operating efficiency. The data recording device 30 may alternatively be communication-connected to the mobile terminal 34 via a wireless communication link or the like instead of the communication connectors 33A, 33B, 33c and communication cables 32A, 32B. Such a modified embodiment also provides the same advantages as the present embodiment described above.

Furthermore, the mobile terminal 34 according to the present embodiment opens the daily maintenance input screen 54, weekly maintenance input screen 56, and monthly maintenance input screen (e.g., 65A or 65B), which respectively display maintenance items that are classified by maintenance intervals (daily, weekly, and monthly maintenance intervals). The daily maintenance input screen 54 and weekly maintenance input screen 56 have the plurality of sheets 58 that displays maintenance items classified by maintenance type, and selectively display one of the plurality of sheets 58. The monthly maintenance input screens (e.g., 65A or 65B) display maintenance items classified according to maintenance type, and have a plurality of sheets 67 that display maintenance items classified by maintenance target, and selectively displays one of the plurality of sheets 67. The use of the above screen configuration increases maintenance efficiency. The method for displaying the maintenance items is not limited to the one described above. The maintenance items to be displayed may alternatively be classified by maintenance intervals, maintenance type, maintenance target, or a combination of these. Such a modified embodiment also provides the same advantages as the present embodiment described above.

Moreover, the mobile terminal 34 opens the outstanding maintenance input screen 68, which extracts and displays outstanding maintenance items automatically or in accordance with the worker's operation. This permits the worker to readily confirm maintenance items that are still not remedied although they are found to be nonconforming or have not been inspected although they are due for maintenance. The outstanding maintenance items may alternatively be displayed in a different manner (e.g., displayed against a different background color or within a frame) within, for instance, the daily maintenance input screen 54, weekly maintenance input screen 56, and monthly maintenance input screen (e.g., 65A, or 65B) instead of opening the outstanding maintenance input screen 68. Such a modified embodiment also provides the same advantages as the present embodiment described above.

The present embodiment described above assumes that the tablet mobile terminal 34 is used. Alternatively, however, a mobile terminal equipped, for instance, with a keyboard may be used. The use of such an alternative mobile terminal also provides the same advantages as the present embodiment. Further, the present embodiment assumes that the present invention is applied to a huge hydraulic excavator 1. However, the present invention is not limited to the use of a huge hydraulic excavator. For example, the present invention may also be applied to large- or medium-size excavators for use at various construction work sites and small-size excavators for use at small-scale work sites. Further, the present invention is also applicable to cranes and other machines in addition to hydraulic excavators. The present invention provides the same advantages even when it is applied to machines other than huge hydraulic excavators.

The invention claimed is:

1. A maintenance history information management system for a construction machine, comprising:
    a data control device being incorporated in the construction machine to store machine information including a model name and a serial number and to process operating time or date and time;
    a mobile terminal including control means for displaying construction machine maintenance items on display means, input means for enabling a worker to enter data for the maintenance items displayed on said display means, and storage means for storing the data entered through said input means as maintenance history data;
    a plurality of communication connectors being provided for maintenance targets of the construction machine and communication-connected to said data control device; and
    a communication cable for enabling to connect said mobile terminal to said communication connectors;
    wherein said mobile terminal inputs the machine information and operating time or date and time from said data control device via said communication cable and said connector and stores the maintenance history data in said storage means in association with the input machine information and operating time or date and time.

2. The maintenance history information management system according to claim 1, wherein said control means of said mobile terminal causes said display means to display the maintenance history data stored in said storage means in accordance with an instruction entered by the worker.

3. The maintenance history information management system according to claim 1, further comprising:
a management server being positioned far away from the construction machine to input the maintenance history data from said mobile terminal via communication means and record the input maintenance history data.

4. The maintenance history information management system according to claim 1, wherein said control means of said mobile terminal classifies the maintenance items by maintenance intervals and causes said display means to display maintenance items that correspond to maintenance intervals entered by the worker.

5. The maintenance history information management system according to claim 1, wherein said control means of said mobile terminal classifies the maintenance items by maintenance type and causes said display means to display maintenance items that correspond to a maintenance type selectively entered by the worker.

6. The maintenance history information management system according to claim 1, wherein said control means of said mobile terminal classifies the maintenance items by maintenance target and causes said display means to display maintenance items that correspond to a maintenance target selectively entered by the worker.

7. The maintenance history information management system according to claim 1, wherein said input means inputs the data on maintenance execution, maintenance results, countermeasure, or replenishment/replacement amount of oil or the like for the maintenance items as the maintenance history data.

8. The maintenance history information management system according to claim 7, wherein said control means of said mobile terminal has a function of extracting maintenance items, which were found to be nonconforming but are still not remedied or are due for maintenance but have not been inspected, and causing said display means to display the extracted maintenance items.

9. The maintenance history information management system according to claim 8, wherein said mobile terminal includes maintenance interval change means for changing maintenance interval settings for the maintenance items.

10. The maintenance history information management system according to claim 9, wherein said maintenance interval change means changes the maintenance intervals setting to a multiple of a basic unit for input maintenance intervals that is close to predefined recommended maintenance intervals for a maintenance item.

11. The maintenance history information management system according to claim 1, wherein said control means of said mobile terminal reads the last maintenance history data stored in said storage means and displays data input fields for the maintenance items and the associated last maintenance history data within the same screen.

12. The maintenance history information management system according to claim 1, wherein said control means of said mobile terminal causes said display means to open a screen into which findings other than predetermined maintenance items can be entered; and said storage means handles data input through said input means into the screen opened by said display means as findings data and stores the findings data in association with the machine information and operating time or date and time, which are input from said data control device via said first communication cable and said communication connectors.

13. A maintenance history information management system for a construction machine that manages the history information about visual inspection of the construction machine having a plurality of zoned maintenance areas accessible to a worker, the maintenance history information management system comprising:
a data control device being incorporated in the construction machine to store machine information including a model names and a serial number and to process operating time or date and time;
a mobile terminal including control means for displaying construction machine maintenance items on display means, input means for enabling the worker to enter data for the maintenance items displayed on said display means, and storage means for storing the data entered through said input means as maintenance history data;
a plurality of communication connectors being provided for maintenance targets of the construction machine and communication-connected to said data control device; and
a communication cable for enabling to connect said mobile terminal to said communication connector;
wherein said mobile terminal inputs the machine information and operating time or date and time from said data control device via said communication cable and said communication connector and stores the maintenance history data in said storage means in association with the input operating time or date and time.

* * * * *